US009618615B2

(12) United States Patent
Inada et al.

(10) Patent No.: US 9,618,615 B2
(45) Date of Patent: Apr. 11, 2017

(54) OBSTACLE DETECTION DEVICE FOR VEHICLE

(75) Inventors: Takahiro Inada, Higashihiroshima (JP); Yasushi Hamada, Aki-gun (JP); Marie Tsurunaga, Aki-gun (JP); Youichiro Nakahata, Aki-gun (JP); Yoshitsugu Hanada, Hiroshima (JP); Fumihiko Nishida, Hiroshima (JP); Yasuyuki Endo, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 426 days.

(21) Appl. No.: 14/112,771

(22) PCT Filed: Apr. 6, 2012

(86) PCT No.: PCT/JP2012/002412
§ 371 (c)(1),
(2), (4) Date: Nov. 21, 2013

(87) PCT Pub. No.: WO2012/144150
PCT Pub. Date: Oct. 26, 2012

(65) Prior Publication Data
US 2014/0070982 A1 Mar. 13, 2014

(30) Foreign Application Priority Data

Apr. 19, 2011 (JP) .................. 2011-092793

(51) Int. Cl.
*G01S 13/93* (2006.01)
*B60R 19/48* (2006.01)
(Continued)

(52) U.S. Cl.
CPC .......... *G01S 13/931* (2013.01); *B60R 19/483* (2013.01); *G01S 7/414* (2013.01);
(Continued)

(58) Field of Classification Search
CPC .......... G01S 13/931; G01S 2013/9389; H01Q 1/3283; B60R 19/483
(Continued)

(56) References Cited

U.S. PATENT DOCUMENTS 6,115,001 A * 9/2000 Taniguchi ............... G01S 19/36
342/357.76
6,496,138 B1 * 12/2002 Honma .................. G01S 13/931
342/27
(Continued)

FOREIGN PATENT DOCUMENTS

CN 101273281 A 9/2008
EP 1400816 A2 3/2004
(Continued)

OTHER PUBLICATIONS

International Search Report; PCT/JP2012/002412; Apr. 6, 2012.
(Continued)

*Primary Examiner* — John B Sotomayor
*Assistant Examiner* — Marcus Windrich
(74) *Attorney, Agent, or Firm* — Studebaker & Brackett PC

(57) ABSTRACT

A vehicle obstacle detection device comprises: a radar unit provided between a back surface of a bumper and a wheel and configured to detect an obstacle by transmitting a radio wave through the bumper; and a misdetection prevention member for preventing misdetection in the radar unit by suppressing the occurrence of an own-vehicle's wheel reaching wave which is a part of a transmission wave and which passes between a transmitter section of the radar unit and the back surface of the bumper and reaches the wheel of the own vehicle.

10 Claims, 23 Drawing Sheets

(51) Int. Cl.
*G01S 7/41* (2006.01)
*G01S 7/28* (2006.01)

(52) U.S. Cl.
CPC ..... *G01S 7/2813* (2013.01); *G01S 2013/9375* (2013.01); *G01S 2013/9378* (2013.01); *G01S 2013/9389* (2013.01)

(58) Field of Classification Search
USPC ........................................................ 342/70
See application file for complete search history.

(56) References Cited

U.S. PATENT DOCUMENTS

| | | | | |
|---|---|---|---|---|
| 2001/0026237 | A1* | 10/2001 | Okai | H01Q 1/405 342/70 |
| 2002/0067305 | A1* | 6/2002 | LeBlanc | B60K 31/0008 342/198 |
| 2004/0056793 | A1 | 3/2004 | Matsubara et al. | |
| 2004/0227663 | A1* | 11/2004 | Suzuki | G01S 7/03 342/70 |
| 2004/0246172 | A1* | 12/2004 | Hirose | G01S 7/038 342/198 |
| 2005/0001757 | A1* | 1/2005 | Shinoda | H01Q 1/3233 342/70 |
| 2005/0110673 | A1* | 5/2005 | Izumi | G01S 7/03 342/70 |
| 2006/0238404 | A1* | 10/2006 | Ikeda | G01S 7/032 342/70 |
| 2007/0200747 | A1* | 8/2007 | Okai | G01S 7/023 342/70 |
| 2008/0191928 | A1 | 8/2008 | Haberland et al. | |
| 2009/0146865 | A1 | 6/2009 | Watanabe et al. | |
| 2013/0141269 | A1* | 6/2013 | Schneider | H01Q 1/3233 342/70 |

FOREIGN PATENT DOCUMENTS

| | | |
|---|---|---|
| JP | H06-083509 U | 11/1994 |
| JP | 2003-279649 A | 10/2003 |
| JP | 2004-101450 A | 4/2004 |
| JP | 2004-258044 A | 9/2004 |
| JP | 2004-361279 A | 12/2004 |
| JP | 2006-317162 A | 11/2006 |
| JP | 2010-223916 A | 10/2010 |
| WO | 2007/043479 A1 | 4/2007 |

OTHER PUBLICATIONS

The First Office Action issued by the Chinese Patent Office on Nov. 3, 2014, which corresponds to Chinese Patent Application No. 201280019282.9 and is related to U.S. Appl. No. 14/112,771; with English language summary.

\* cited by examiner

OBSTACLE DETECTION DEVICE FOR VEHICLE

TECHNICAL FIELD

The present invention relates, to a vehicle obstacle detection device for detecting an obstacle by transmitting a radio wave, from a radar unit provided between a back surface of a bumper and another vehicle component, toward an outside of an own vehicle through the bumper.

BACKGROUND ART

Generally, in a vehicle obstacle detection device using a radar, it is extremely important to discriminate between a target vehicle (another vehicle around an own vehicle) as a target object to be detected, and an object other than the target vehicle. An error in the discrimination leads to a situation where an object other than the target vehicle is recognized as the target vehicle, and consequently becomes a factor for erroneous alarm or erroneous control.

For example, a vehicle obstacle detection device for detecting, as an obstacle, another vehicle around an own vehicle is configured to attach a radar unit to a rear end panel in front of a rear bumper, through a bracket, and transmit a radio wave from the radar unit toward an outside of the own vehicle through the resin bumper, thereby detecting the another vehicle. However, if, as a result, for example, of undergoing reflection by a back surface of the rear bumper, a part of a transmission wave from the radar unit is oriented to pass between a transmitter section of the radar unit and the back surface of the rear bumper and reach a rear wheel of the own vehicle, and then a reflected wave returned from the rear wheel is input into a receiver section of the radar unit, a problem occurs that the rear wheel of the own vehicle is misdetected as a target vehicle although it is not really a target vehicle.

As measures to prevent such a misdetection, it is conceivable to arrange a transmitter-receiver section of the radar unit in close contact relation with the back surface of the bumper. However, this is undesirable from a practical standpoint, because an external impact force added to the bumper due to a mild rear impact collision or the like leads immediately to malfunction and/or damage of the radar.

Meanwhile, the following Patent Document 1 discloses a radar unit designed to reduce a reflection loss due to a back surface of a bumper, wherein a reference frequency fo of a transmission beam is controlled based on a reception beam, to minimize the reflection loss from the bumper. However, the Patent Document 1 neither discloses nor suggests the aforementioned misdetection.

The following Patent Document 2 discloses a radio wave radar mounting structure in which a shield plate or a radio wave absorbing material is provided between a radio wave radar and a radiator fan located behind the radio wave radar to prevent a situation where a side lobe emitted from the radio wave radar and reflected by a vehicle body reaches the radiator fan. Even if the radiator fan is located behind the radar, this structure makes to possible to prevent a rise in noise floor due to detection of the radiator fan by the side lobe, thereby obtaining stable target detection performance. However, the Patent Document 2 does not disclose a technical problem of how to prevent the misdetection caused by the phenomenon that a part of a transmission wave from a radar unit passes between a transmitter section of the radar unit and a back surface of a bumper and reaches a wheel of an own vehicle, and then a reflected wave is returned from the wheel.

LIST OF PRIOR ART DOCUMENTS

Patent Documents

Patent Document 1: JP 2006-317162A
Patent Document 2: JP 2004-101450A

SUMMARY OF THE INVENTION

The present invention has been made in view of the above problem, and an object thereof is to provide a vehicle obstacle detection device capable of preventing a situation where a wheel of an own vehicle is misdetected as a target.

In order to achieve this object, a vehicle obstacle detection device of the present invention comprises: a radar unit provided between a back surface of a bumper and a wheel and configured to detect an obstacle by transmitting a radio wave toward an outside of an own vehicle through the bumper, and a misdetection prevention member for preventing misdetection in the radar unit by suppressing the occurrence of an own-vehicle's wheel reaching wave which is a part of a transmission wave from the radar unit and which passes between a transmitter section of the radar unit and the back surface of the bumper and reaches the wheel of the own vehicle.

BRIEF DESCRIPTION OF THE DRAWINGS

FIG. 13 is a sectional view illustrating a sixth embodiment for a vehicle obstacle detection device, wherein

FIG. 14 is a sectional view illustrating a seventh embodiment for a vehicle obstacle detection device, wherein

DESCRIPTION OF EMBODIMENTS

Based on the drawings, embodiments of the present invention will now be described. While each of the drawings represents a vehicle obstacle detection device, the following embodiments will be described by taking, as an example, one type of vehicle obstacle detection device designed to detect an obstacle, such as another vehicle (target) following an own vehicle.

First Embodiment

Figure 1:
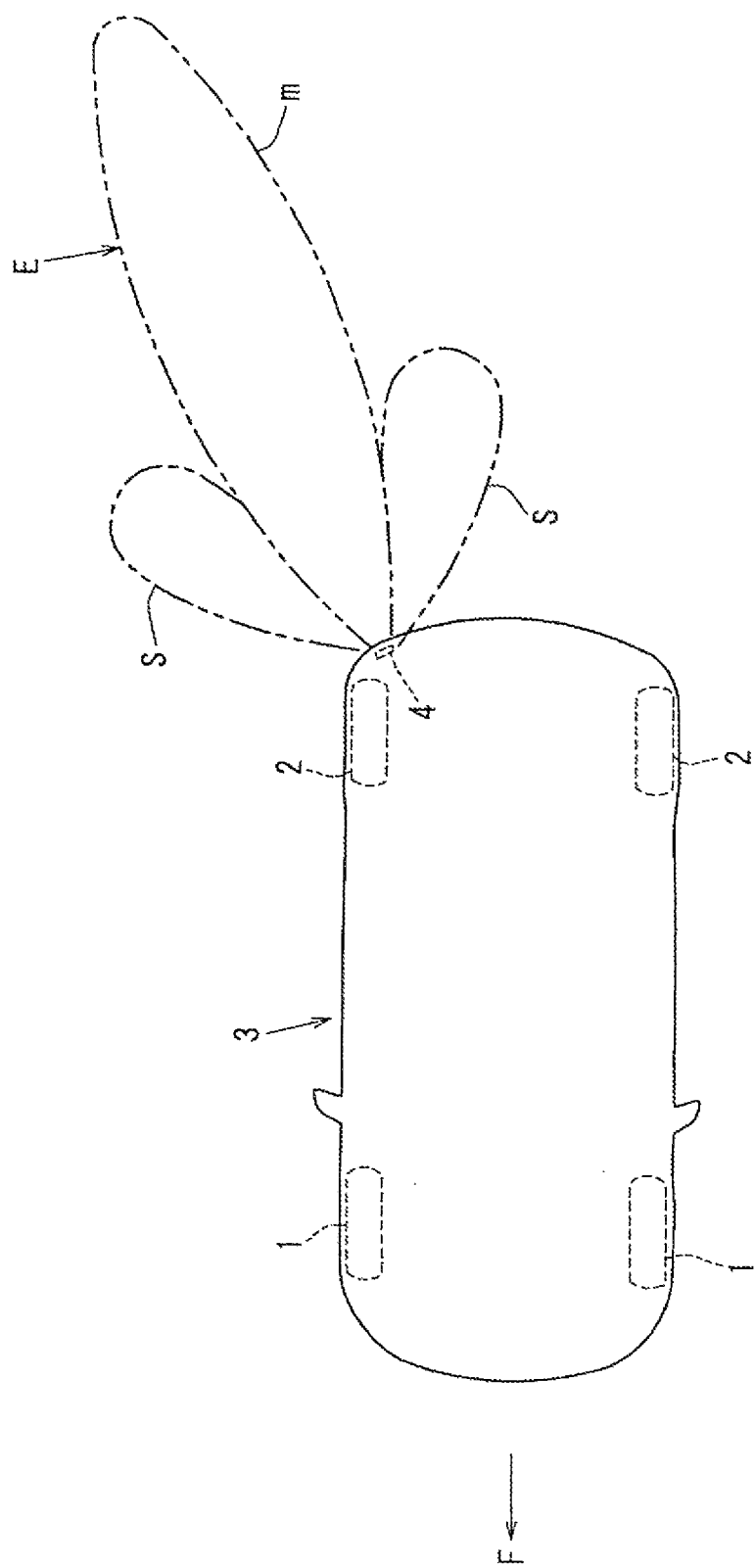
FIG. 1 is a top plan view illustrating an obstacle detection area of a vehicle obstacle detection device according to the present invention (first embodiment).

FIG. 1 is a schematic top plan view illustrating a vehicle equipped with a vehicle obstacle detection device according to the present invention, and an obstacle detection area to be covered by the vehicle obstacle detection device. A radar unit 4 is provided between a back surface of a bumper of a vehicle 3 having front wheels 1, 1 and rear wheels 2, 2, and one 2 of the rear wheels. The radar unit 4 is configured to detect whether or not an obstacle is present. That is, a radio wave emitted from a transmitter-receiver section 4a of the radar unit 4 is transmitted toward an outside of the vehicle, specifically, in a vehicle-rearward and vehicle-widthwise outward direction, through a bumper made of a resin, and, after being reflected by an obstacle, returned to the transmitter-receiver section 4a. In response to receiving the reflected wave, the radar unit 4 detects the presence of an obstacle.

In FIG. 1, an obstacle detection area of the radar unit 4 is indicated by the code E. In this embodiment, the radio wave of the radar unit 4 is a microwave (SHF) having a wavelength of 1 cm to 10 cm, and a frequency of 24 GHz.

Figure 2:
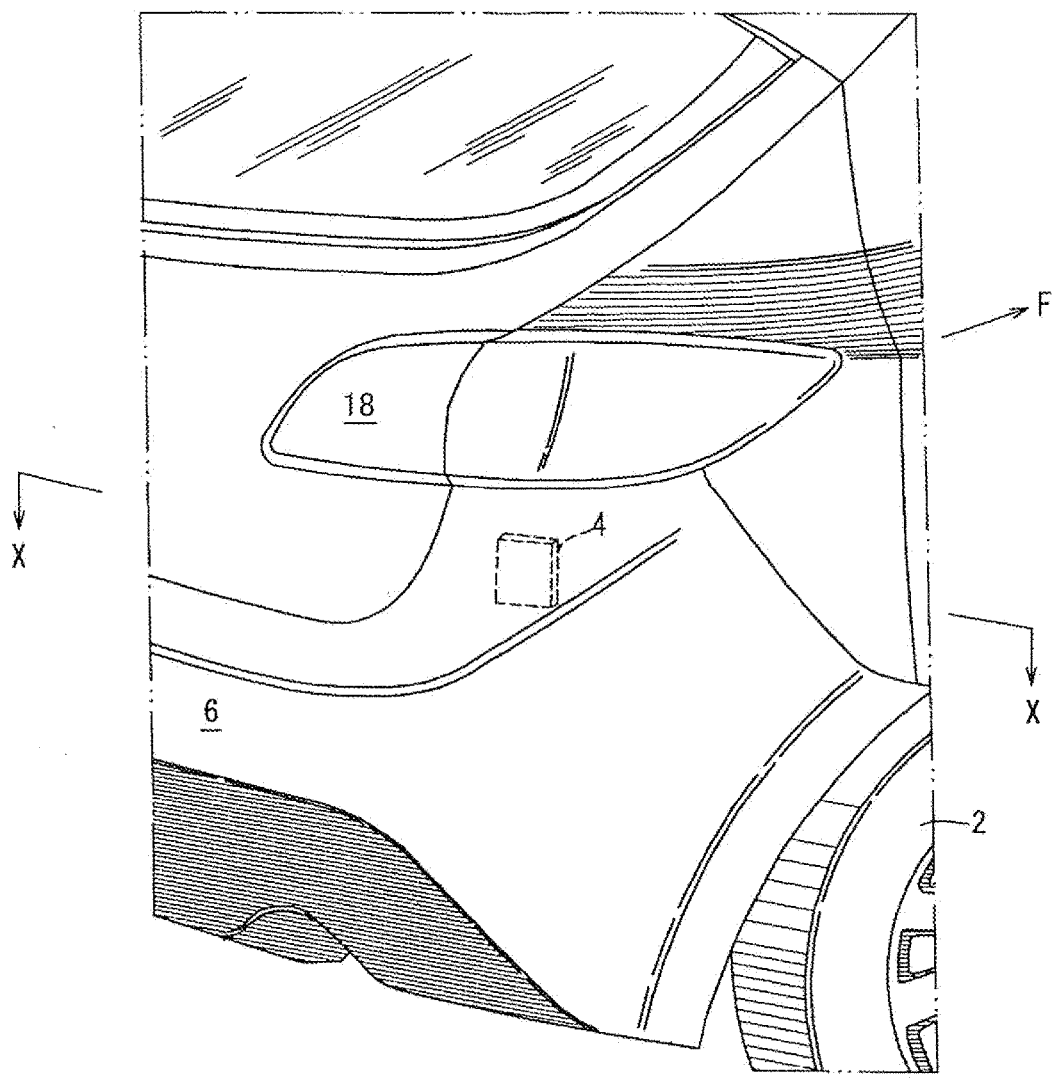
FIG. 2 is a fragmentary perspective view of a right rear portion of a vehicle.
Figure 3:
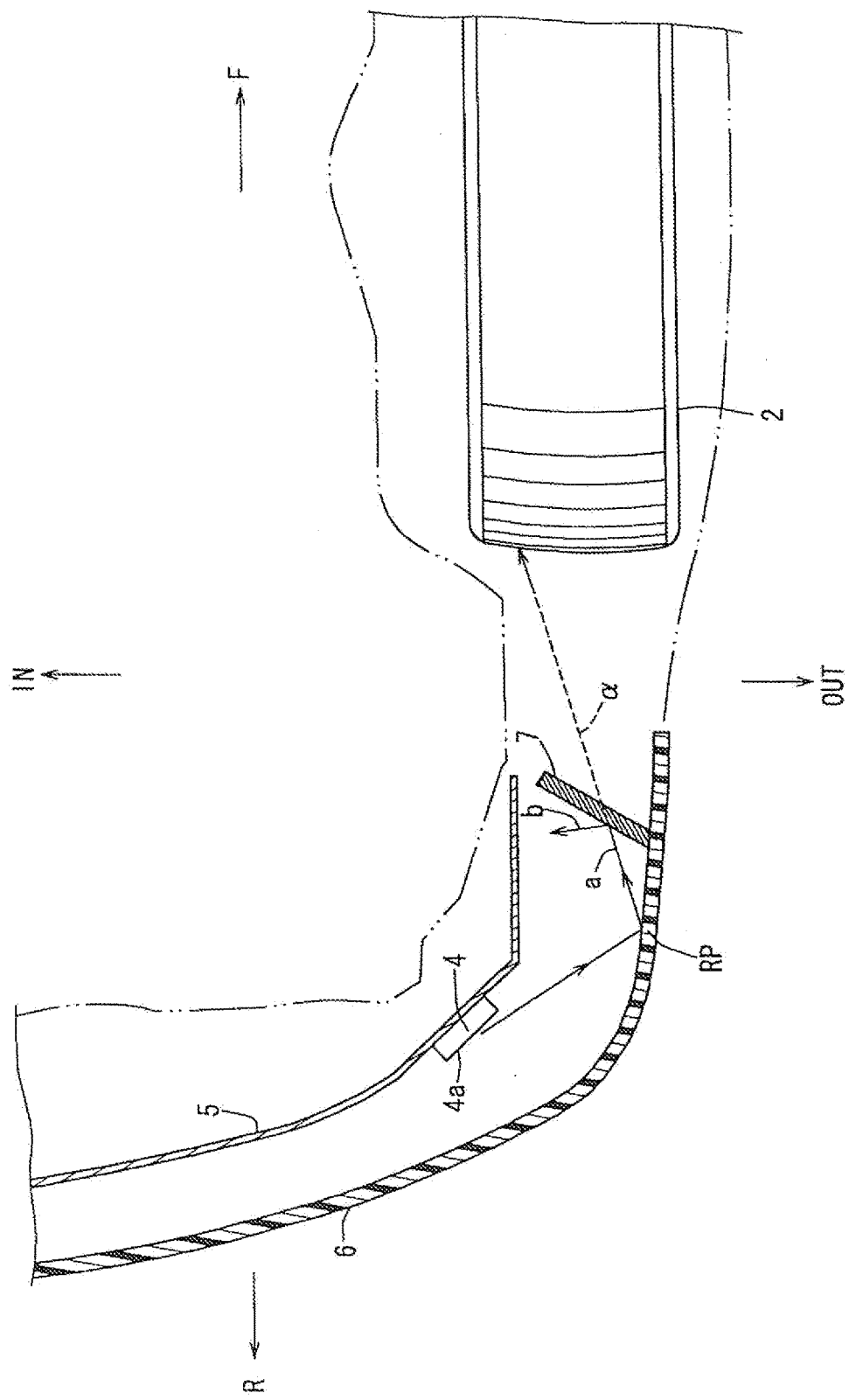
FIG. 3 is a sectional view taken along the line X-X in FIG. 2.

FIG. 2 is a fragmentary perspective view of a right rear portion of the vehicle, and FIG. 3 is a sectional view taken along the line X-X in FIG. 2.

As illustrated in FIG. 3, in a rear end region of the vehicle, a rear end panel 5 is provided which extends in a vehicle width direction, and has a vehicle-widthwise end formed to bend in a vehicle forward direction. On a vehicle rearward side of the rear end panel 5, a rear bumper 6 made of a synthetic resin is provided which covers the rear end panel 5 from therebehind in spaced-apart relation thereto.

In the first embodiment, the radar unit 4 is fixed directly to the rear end panel 5 or fixed to the rear end panel 5 through a non-illustrated bracket.

While most of a transmission wave from the radar unit 4 is transmitted in the vehicle-rearward and vehicle-widthwise outward direction through the rear bumper 6 as illustrated in FIG. 1, a part of the transmission wave is reflected by a back surface of the rear bumper 6, in such a manner as to be oriented to pass between the transmitter section of the radar unit 4 and the back surface of the rear bumper 6, in a direction toward the rear wheel 2 as a wheel of an own vehicle (own-vehicle's wheel). If the above transmission wave reaches the rear wheel 2 as indicated by the broken line in the figure, and the resulting tire reaching wave α (equivalent to "own-vehicle's wheel reaching wave" set forth in the appended claims) is returned from the rear wheel to the radar unit 4, the wave α is likely to cause misdetection of an obstacle. In this embodiment, with a view to preventing misdetection caused by the tire reaching wave α, a shield plate 7 is provided to serve as a misdetection prevention member.

As illustrated in FIG. 3, the shield plate 7 is provided to block a path of the tire reaching wave α. In this embodiment, the shield plate 7 is provided at a position closer to the rear wheel 2 of the own vehicle than a reflection point RP where the tier reaching wave α is reflected by the back surface of the bumper 6.

In this embodiment, the shield plate 7 is bonded and fixed to the back surface of the rear bumper 6 using an adhesive, in a region where a vehicle-widthwise end of the rear bumper 6 is formed to bend in the vehicle forward direction, and disposed to extend from the fixed position in a vehicle forward and vehicle-widthwise inward direction.

In this regard, considering that a vibrational mode of the rear end panel 5 and a vibrational mode of the rear bumper 6 are different from each other during running of the vehicle, an inward end of the shield plate 7 is spaced apart from the rear end panel 5 in order to ensure durability of the shield plate 7. Further, in order to achieve a reduction in weight, the shield plate is made of a synthetic resin.

In FIG. 2, the code 18 indicates a rear combination lamp. In FIG. 1, the codes m and S indicate, respectively, schematic representations of a main lobe and a side lobe in the transmission radio wave. Further, in FIGS. 1 to 3, the arrowed line F and the arrowed line R indicate, respectively, the vehicle forward direction and the vehicle rearward direction, and the arrowed line IN and the arrowed line OUT indicate, respectively, the vehicle-widthwise inward direction and the vehicle-widthwise outward direction.

An operation of the vehicle obstacle detection device configured as above will be described below.

When another vehicle as a target intrudes into the obstacle detection area E of the radar unit 4 illustrated in FIG. 1 (although schematically illustrated in the figure, it is an area having a length of less than about 50 m and a relatively wide width), the transmitter-receiver section 4a (see FIG. 3) of the radar unit 4 receives a wave which is incident on and reflected by another vehicle (obstacle), so that the radar unit 4 detects the another vehicle (normal obstacle detection).

Supposing that this vehicle obstacle detection device is devoid of the shield plate 7 illustrated in FIG. 3, as a result, for example, of undergoing reflection by the back surface of the rear bumper 6, a part of a transmission wave emitted from the radar unit 4 is oriented to pass between the transmitter-receiver section 4*a* of the radar unit 4 and the back surface of the rear bumper 6 and reach the rear wheel 2 as indicated by the broken line in FIG. 3, and then this tire reaching wave α is returned from the rear wheel 2, thereby causing the radar unit 4 to misdetect the rear wheel 2 as a target although it is not really a target.

However, in this embodiment, the shield plate 7 serving as a misdetection prevention member is provided to block the path of the tire reaching wave α as mentioned above, so that the misdetection is prevented.

That is, as a result of providing the shield plate 7, as illustrated in FIG. 3, a part of a transmission wave emitted from the transmitter-receiver section 4*a* of the radar unit 4 is oriented to become incident on the shield plate 7 as indicated the arrowed line a in FIG. 3, and reflected by the shield plate 7 under a condition that an incident angle is equal to an output angle (see the arrowed lire b). The reflected wave b is oriented in a direction exerting no influence on misdetection (in the illustrated embodiment, in a direction away from the rear wheel 2), and will attenuate or disappear. In this manner, the occurrence of the tire reaching wave α is suppressed.

As above, the vehicle obstacle detection device according to the first embodiment illustrated in FIGS. 1 to 3 comprises: the radar unit 4 provided between the back surface of the rear bumper 6 and the rear wheel 2 and configured to detect an obstacle by transmitting a radio wave toward an outside of an own vehicle through the rear bumper 6; and the shield plate 7 (misdetection prevention member) for preventing misdetection in the radar unit 4 by suppressing the occurrence of an own-vehicle's wheel reaching wave which is a part of a transmission wave from the radar unit 4 and which passes between a transmitter section of the radar unit 4 and the back surface of the rear bumper 6 and reaches the rear wheel 2 (wheel of the own vehicle) (see FIG. 3). In this embodiment, as a radio wave (transmission wave) of the radar unit 4, a microwave wave or a millimeter wave is employed, and, for example, a radio wave having a frequency of 24 GHz or 76 GHz is used. Further, as the rear bumper 6, a resin bumper is used which is capable of allowing radio waves to be transmitted therethrough.

In this embodiment, the misdetection prevention member (see the shield plate 7) is provided. This effectively prevents a situation where a part of a transmission wave from the radar unit 4 passes between the transmitter-receiver section 4*a* of the radar unit 4 and the back surface of the rear bumper 6 and reaches the rear wheel 2 of the own vehicle. That is, the occurrence of the tire reaching wave α is suppressed. This effectively prevents the situation where the tire reaching wave α is returned from the rear wheel 2 to the radar 4, thereby causing the radar unit 4 to misdetect the rear wheel 2 as a target.

In addition, the misdetection prevention member is characterized in that it is the shield plate 7 provided to block the path of the tire reaching wave α (see FIG. 3). According to this feature, the misdetection prevention member can be constructed by the simple shield plate 7.

Further, the shield plate 7 is provided closer to the rear wheel 2 of the own vehicle than the reflection point RP where the tire reaching wave α is reflected by the back surface of the rear bumper 6 (see FIG. 3). According to this feature, the shield plate 4 is provided closer to the rear wheel 2 of the own vehicle than the reflection point RP, so that it becomes possible to block the partial transmission wave at a position maximally close to the rear wheel 2, and effectively suppress the occurrence of the tire reaching wave α.

Second Embodiment

Figure 4:
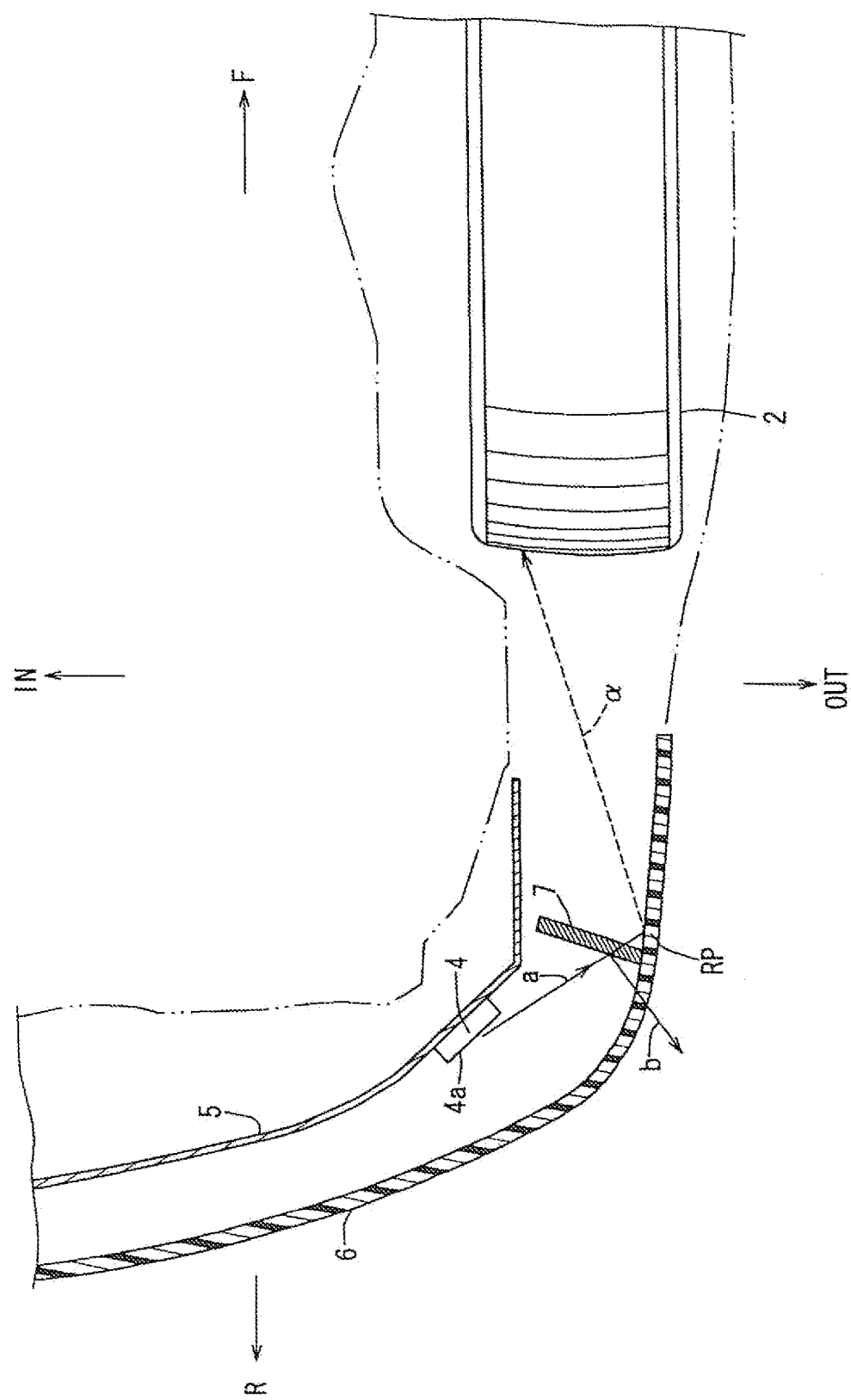
FIG. 4 is a sectional view illustrating a second embodiment for a vehicle obstacle detection device.

FIG. 4 is a sectional view illustrating a second embodiment for a vehicle obstacle detection device. In this embodiment, a radar unit 4 is attached to a rear end panel 5 in the same manner as that in the first embodiment. Further, the aforementioned shield plate 7 is bonded and fixed to a back surface of a rear bumper 6, in a region where a vehicle-widthwise end of the rear bumper 6 is formed to bend in a vehicle forward direction, and disposed to extend from the fixed position toward the radar unit 4 approximately along a vehicle-widthwise inward direction. Further, the shield plate 7 is provided closer to the radar unit 7 than the reflection point RP where the tire reaching wave α is reflected by the back surface of the rear bumper 6.

In the second embodiment, a part of a transmission wave emitted from a transmitter-receiver section 4*a* of the radar unit 4 is oriented to become incident on the shield plate 7 at a position just before the reflection point RP, as indicated the arrowed line a in FIG. 4, and reflected by the shield plate 7 under a condition that an incident angle is equal to an output angle (see the arrowed line b). The reflected wave b is oriented in a direction exerting no influence on misdetection (in the illustrated embodiment, in a direction away from a rear wheel 2), and will attenuate or disappear. In this manner, the occurrence of the tire reaching wave α is suppressed. In the second embodiment, an inward end of the shield plate 7 is also spaced apart from the rear end panel 5.

In the second embodiment, the shield plate 7 is provided to extend from the back surface of the rear bumper 6 toward the radar unit 4 (see FIG. 4). According to this feature, the shield plate 7 provided to extend from the back surface of the rear bumper 6 toward the radar unit 4 makes it possible to suppress the occurrence of the tire reaching wave α, thereby preventing a situation where the radar unit 4 misdetects the rear wheel 2 as a target.

Although illustration is omitted, in the first and second embodiments, the shield plate 7 may be formed together with the rear bumper 6 as a single-piece molded body or an integral assembly.

Other features, functions and advantages of the second embodiment are the same as those of the first embodiment. Thus, in FIG. 4, the same element or component as that in the first embodiment is assigned with a common reference numeral or code, and its detailed description will be omitted.

Third Embodiment

Figure 5:
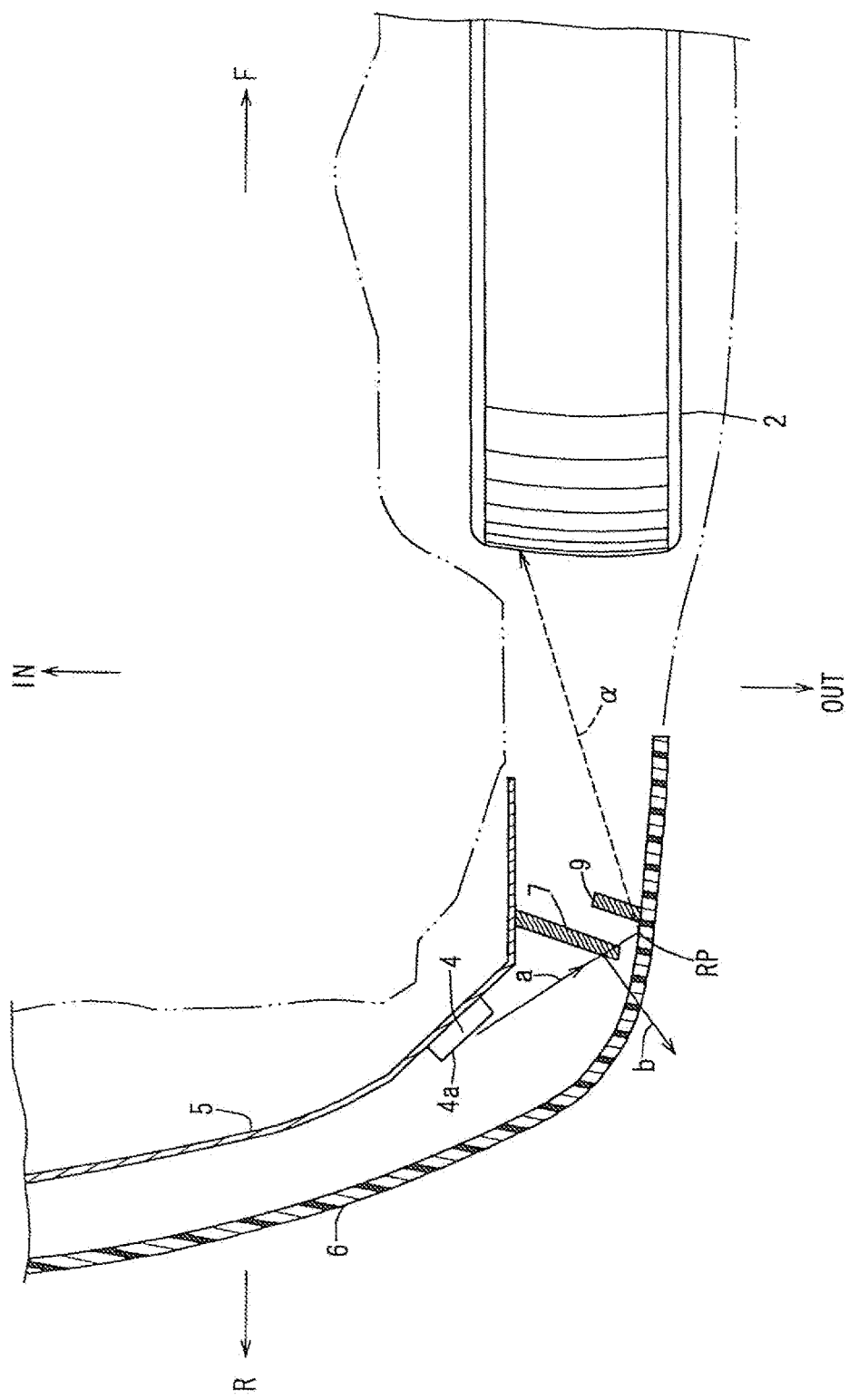
FIG. 5 is a sectional view illustrating a third embodiment for a vehicle obstacle detection device.

FIG. 5 is a sectional view illustrating a third embodiment for a vehicle obstacle detection device. In this embodiment, a radar unit 4 is attached to a rear end panel 5 in the same manner as that in the aforementioned first and second embodiments. Further, in a region where both of opposed vehicle-widthwise ends of the rear end panel 5 and a rear bumper 6 are formed to bend in a vehicle forward direction, a shield plate 7 is provided to extend from the rear end panel 5 toward the rear bumper 6 in a vehicle-widthwise outward and vehicle-rearward direction, and another shield plate 9 is provided to extend from the rear bumper 6 toward the rear end panel 5 in a vehicle-widthwise inward and vehicle-forward direction. A rearward end of the one shield plate 7 is spaced apart from a back surface of the rear bumper 6, and an inward end of the other shield plate 9 is spaced apart from the rear end panel 5.

Further, the shield plates 7, 9 are disposed in spaced-apart relation to each other in a vehicle front-rear direction, and in mutually overlapping relation when viewed from a direction oblique to the vehicle front-rear direction and perpendicular to the shield plates 7, 9. In this manner, the path of the tire reaching wave α is completely blocked by the shield plates 7, 9.

According to this feature, the path of the tire reaching wave α can be reliably blocked by the pair of shield plates 7, 9. Further, one and the other of the shield plates 7, 9 are fixed, respectively, to the rear end panel 5 and the rear bumper 6, so that assemblability of both of them 7, 9 is enhanced, and there is no concern about the occurrence of abnormal noise during vehicle running.

Other features, functions and advantages of the third embodiment are the same as those of the aforementioned embodiments. Thus, in FIG. 5, the same element or component as that in the aforementioned embodiments is assigned with a common reference numeral or code, and its detailed description will be omitted.

Fourth Embodiment

Figure 6:
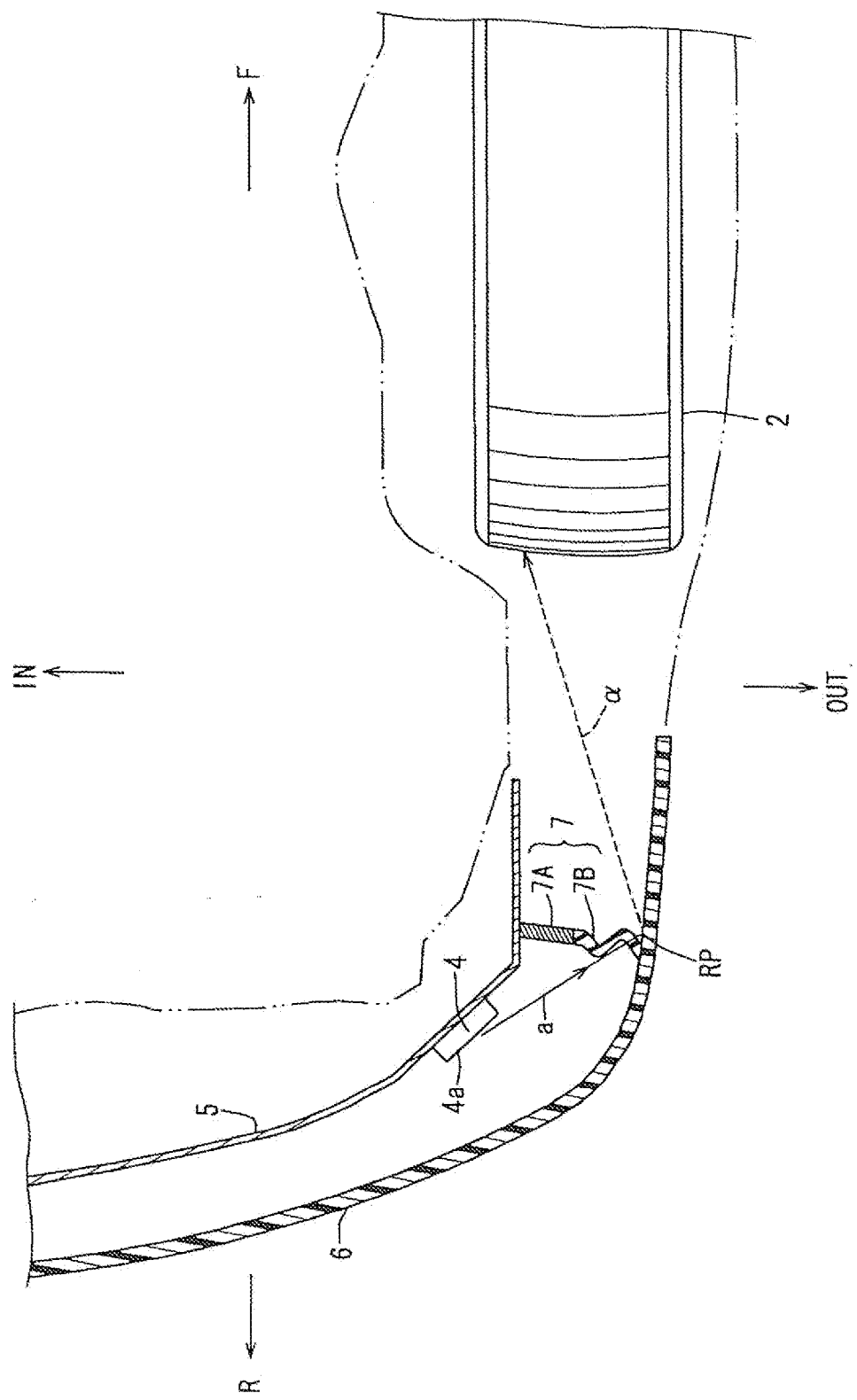
FIG. 6 is a sectional view illustrating a fourth embodiment for a vehicle obstacle detection device.

FIG. 6 is a sectional view illustrating a fourth embodiment for a vehicle obstacle detection device. In this embodiment, a radar unit 4 is attached to a rear end panel 5 in the same manner as that in the aforementioned first to third embodiments. Then, a shield plate 7 is completely block the path of the tire reaching wave α, in a region where both of opposed vehicle-widthwise ends of the rear end panel 5 and the rear bumper 6 are formed to bend in a vehicle forward direction. Differently, in the fourth embodiment, the shield plate 7 comprises a flat plate 7A made of a synthetic resin and fixed to the rear end panel 5, and a radio wave absorbing member 7B composed a member, such as a rubber member, connected to the flat plate 7A and fixed to a back surface of the rear bumper 6.

In the fourth embodiment, a part of a transmission wave emitted from a transmitter-receiver section 4a of the radar unit 4 is oriented to become incident on the radio wave absorbing member 7B of the shield plate 7 as indicated the arrowed line a in FIG. 6, and absorbed therein, so that it will significantly attenuate to a level enough to avoid misdetection, or disappear. Thus, the occurrence of the tire reaching wave α is effectively suppressed. This prevents a situation where the radar unit 4 misdetects the rear wheel 2 as a target.

Other features, functions and advantages of the fourth embodiment are the same as those of the aforementioned embodiments. Thus, in FIG. 6, the same element or component as that in the aforementioned embodiments is assigned with a common reference numeral or code, and its detailed description will be omitted.

Fifth Embodiment

Figure 7:
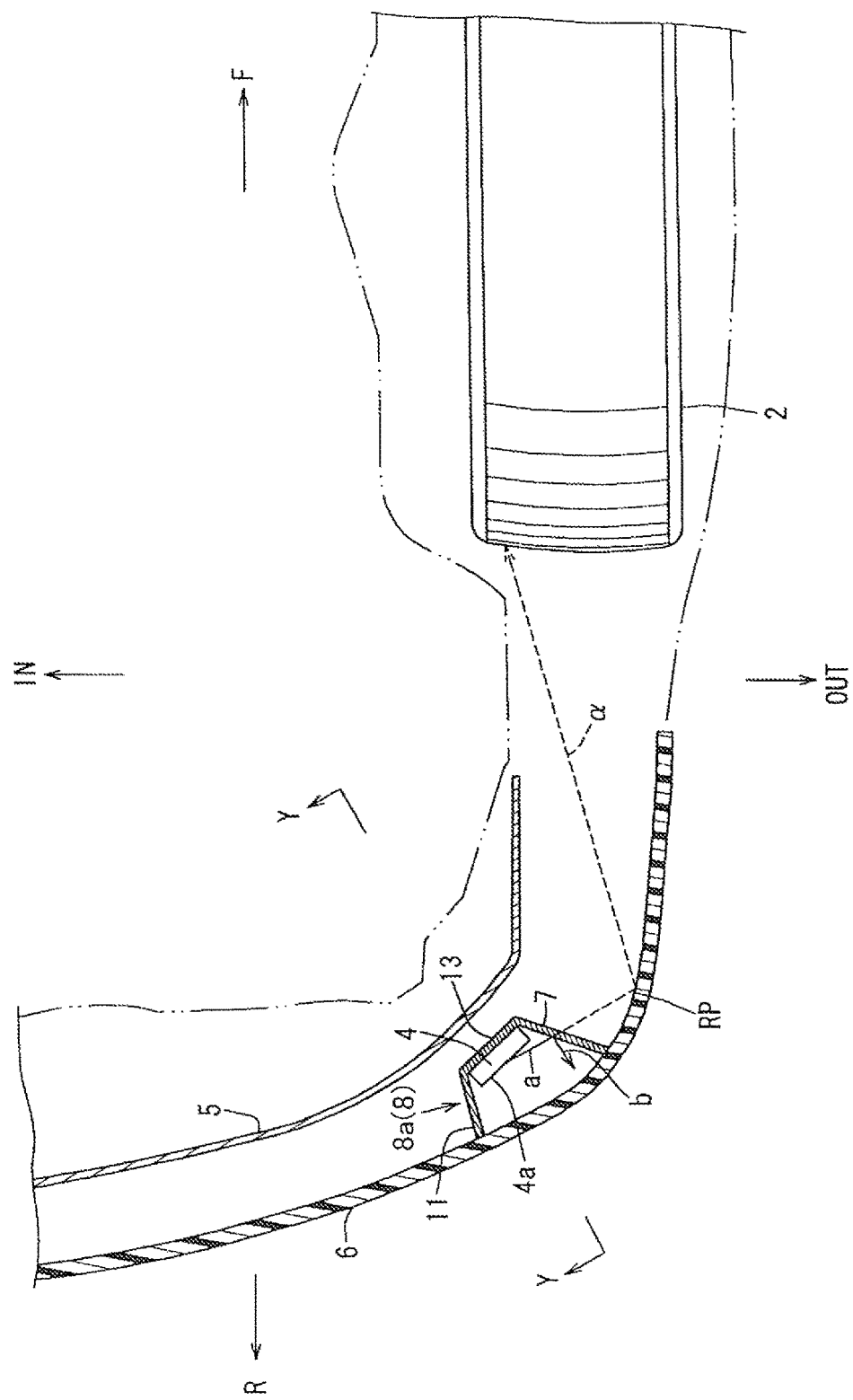
FIG. 7 is a sectional view illustrating a fifth embodiment for a vehicle obstacle detection device.
Figure 8:
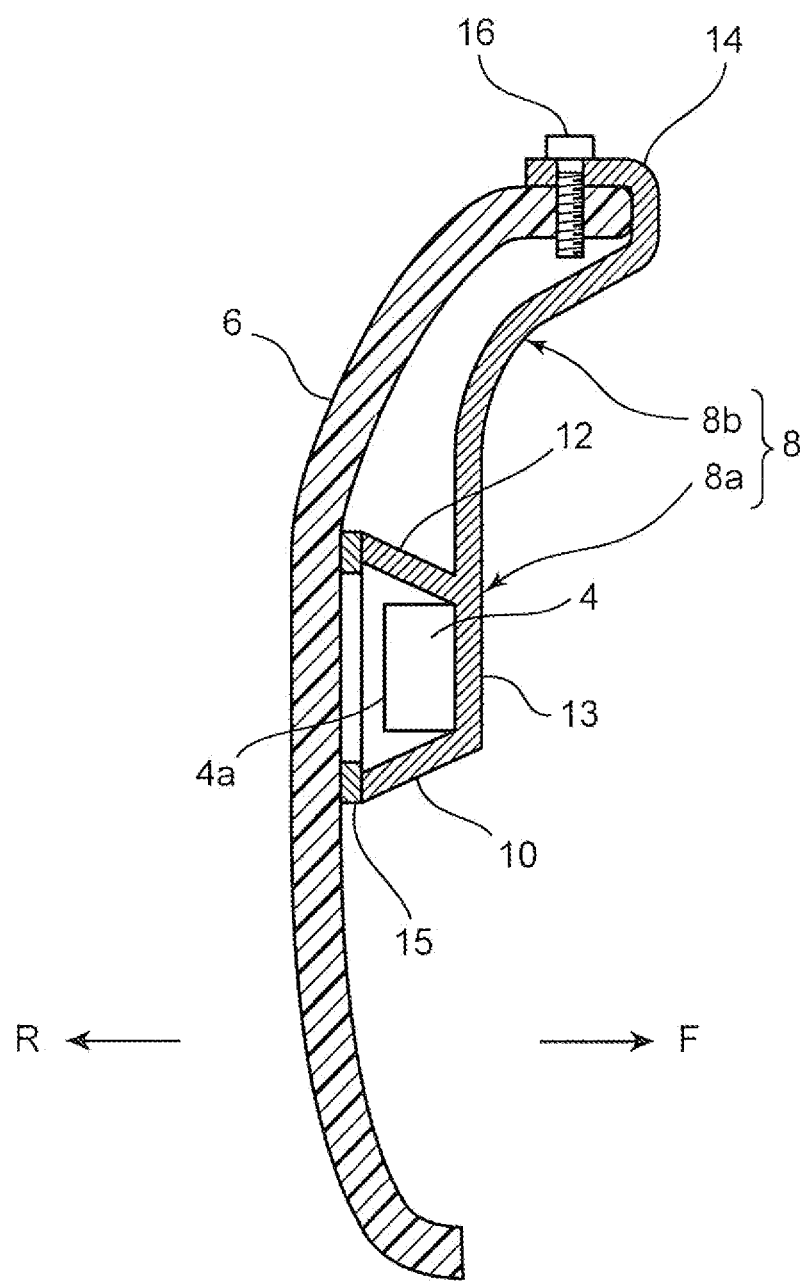
FIG. 8 is a sectional view taken along the line Y-Y in FIG. 7.
Figure 9:
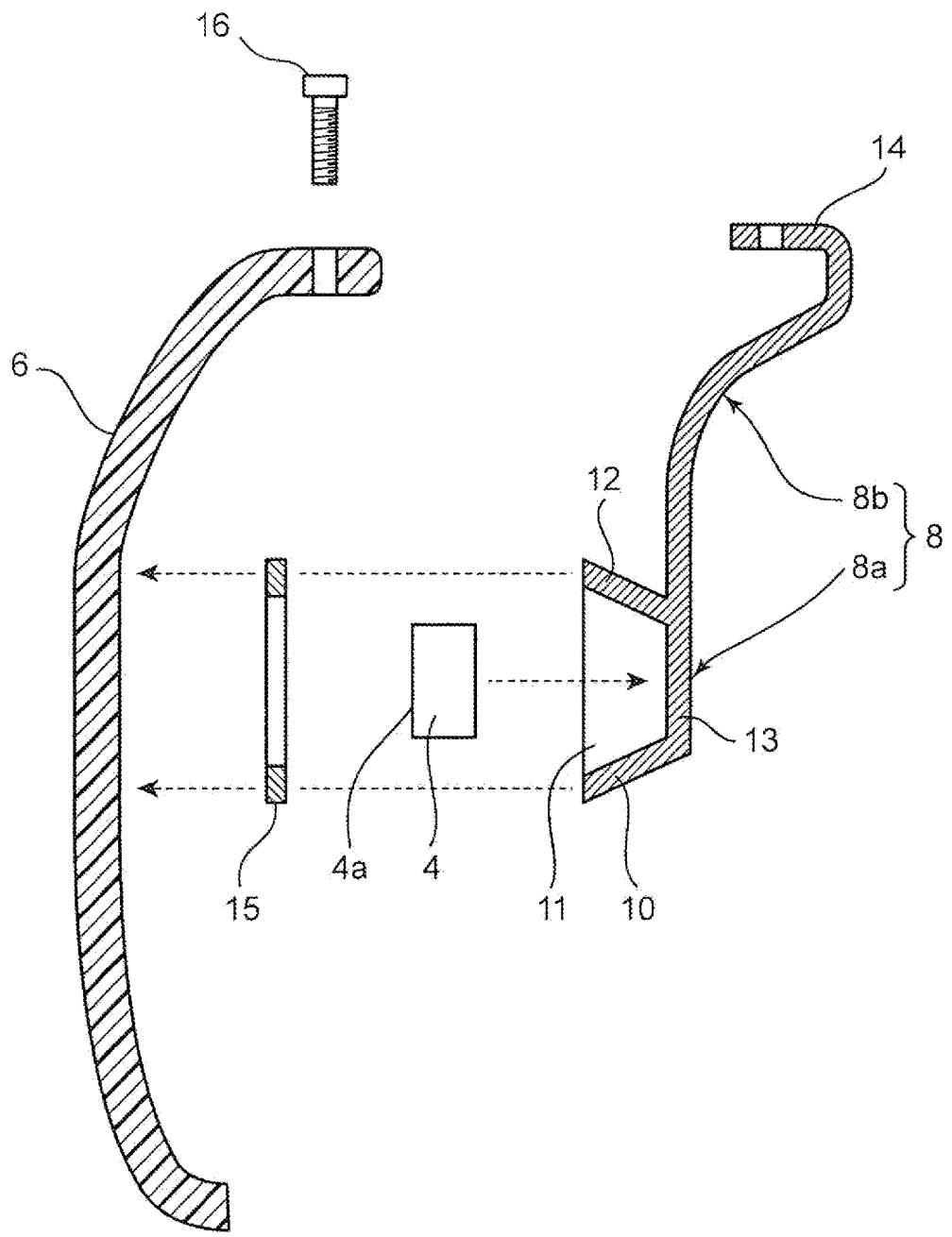
FIG. 9 is an exploded diagram of the vehicle obstacle detection device illustrated in FIG. 7.

FIGS. 7, 8 and 9 illustrate a fifth embodiment for a vehicle obstacle detection device, wherein FIG. 7, FIG. 8 and FIG. 9 are, respectively: a sectional view; a fragmentary sectional view taken along the line Y-Y in FIG. 7; and an exploded diagram. In the aftermentioned first to fourth embodiments, the radar unit 4 is attached to the rear end panel 5, whereas, in the fifth embodiment, a radar unit 4 is attached to a rear bumper 6.

That is, in the fifth embodiment, the radar unit 4 is attached to and supported by the rear bumper 6 through an attaching member 8 as illustrated in FIGS. 7, 8 and 9.

The attaching member 8 has a box-shaped housing section 8a, and an arm section 8b extending upwardly from the housing section 8a. The radar unit 4 is attached to and supported by the rear bumper 6 through the attaching member 8, while being housed in the housing section 8a.

The housing section 8a comprises a shield plate 7 (aftermentioned right cover) blocking a path between a vehicle-widthwise outward side of the radar unit 4 and a back surface of the rear bumper 6. Thus, as illustrated in FIG. 7, a part of a transmission wave emitted from the radar unit 4 is oriented to become incident on the shield plate 7 as indicated the arrowed line a in FIG. 7, and reflected by the shield plate 7 under a condition that an incident angle is equal to an output angle (see the arrowed line b).

The shield plate 7 may be made of a metal, or may be made of a synthetic resin. Further, it may have a structure in which a metal tape is bonded to a surface of a synthetic resin plate or may have a structure in which a metal layer is formed on a surface of a synthetic resin by vapor deposition or chemical plating. Alternatively, it may be formed as a radio wave absorbing body (e.g., a material obtained by mixing carbon in a rubber material). In the fifth embodiment, in order to satisfy both a need for reduction in weight and a need for improvement in productivity, the entire attaching member 8 including the shield plate 7 is integrally formed using a synthetic resin.

The housing section 8a comprises: a lower cover 10 covering a lower surface of the radar unit 4; a left cover 11 covering a left surface of the radar unit 4; the shield plate 7 serving as a right cover covering a right surface of the radar unit 4; an upper cover 12 covering an upper surface of the radar unit 4; and a back cover 13 covering a back surface of the radar unit 4. Although illustration is omitted, the upper cover 12 may be formed with an opening for maintenance of the radar unit 4. On the other hand, the arm section 8b comprises a locking portion 14 formed in a reverse L-shape in side view to allow the attaching member 8 to be locked to a top surface of the rear bumper 6 in a suspended state.

The attaching member 8 is prepared by forming the above elements 7 and 10 to 14 (the housing section 8a and the arm section 8b) as a single-piece molded body or an integral assembly, and attached to the rear bumper 6 by fixing the locking portion 14 to the top surface of the rear bumper 6 using a bolt 16 or the like, as illustrated in FIGS. 8 and 9.

As illustrated in FIG. 7, an opening-defining edge face of the housing section 8a, i.e., respective bumper-side edge faces of the shield plate 7 (right cover), the lower cover 10, the left cover 11 and the upper cover 12 are fixed to the back surface of the rear bumper 6 in a close contact state. More specifically, as illustrated in FIGS. 8 and 9, rear edge faces of the covers 10, 11, 12 and the shield plate 7 are fixed in close contact relation to the back surface of the rear bumper 6, through a fixing member 15 such as a double-faced adhesive tape or an adhesive. Alternatively, the housing section 8a may be fixed to the rear bumper 6 by a bolt or an adhesive.

As illustrated in FIG. 7, the left cover 11 and the shield plate 7 located on respective left and right sides of the radar unit 4 are formed in a folding-fan shape broadening from the radar unit 4 toward the back surface of the rear bumper 6. Similarly, as illustrated in FIG. 8, the upper cover 12 and the lower cover 10 located on respective upper and lower sides of the radar unit 4 are formed in a folding-fan shape broadening from the radar unit 4 toward the back surface of the rear bumper 6. That is, the housing section 8a of the attaching member 9 is formed to define a folding-fan shaped space, between a transmitter-receiver portion 4a of the radar unit 4 housed in the housing section 8a and the back surface of the rear bumper 6, so as not to disturb a transmitting-receiving area for transmission and reception waves, and configured to maximally reduce an incident angle of a part of a transmission wave with respect to each of the elements 7, 10, 11, 12 by an inclined structure of the elements 7, 10, 11, 12 based on the folding-fan shape, thereby transmitting the partial transmission wave in a direction which is less likely to cause misdetection. In this case, when the incident angle of a part of a transmission wave is set to a small value, the partial transmission wave is approximately totally reflected under a condition that an incident angle is equal to an output angle.

An operation of the vehicle obstacle detection device according to the fifth embodiment configured as above will be described below.

Supposing that the device illustrated in FIG. 7 is devoid of the shield plate 7, as a result, for example, of undergoing reflection by the back surface of the rear bumper 6, a part of a transmission wave emitted from the radar unit 4 is oriented to pass between the transmitter-receiver section 4a of the radar unit 4 and the back surface of the rear bumper 6 and reach a rear wheel 2 as indicated by the broken line in FIG. 7, and then this tire reaching wave α is returned from the rear wheel 2, so that the radar unit 4 misdetects the rear wheel 2 of the own vehicle as a target although it is not really a target.

However, in this embodiment, the shield plate 7 (right cover of the housing section 8a) serving as a misdetection prevention member is provided to block the path of the tire reaching wave α as mentioned above, so that the misdetection is prevented.

That is, as a result of providing the shield plate 7 in the housing section 8a, as illustrated in FIG. 7, a part of a transmission wave emitted from the transmitter-receiver section 4a of the radar unit 4 is oriented to become incident on the shield plate 7 as indicated the arrowed line a in FIG. 7, and reflected by the shield plate 7 under a condition that an incident angle is equal to an output angle (see the arrowed line b). The reflected wave b is oriented in a direction exerting no influence on misdetection (in the illustrated embodiment, in a direction away from the rear wheel 2), and will attenuate or disappear. In this manner, the occurrence of the tire reaching wave α is effectively suppressed.

As above, in the fifth embodiment illustrated in FIGS. 7 to 9, the shield plate 7 is provided to extend from the radar unit 4 toward the back surface of the rear bumper 6 (see FIG. 8). According to, this feature, the shield plate 7 provided to extend toward the back surface of the rear bumper 6 makes it possible to prevent the occurrence of the tire reaching wave α, thereby preventing a situation where the radar unit 4 misdetects the rear wheel 2 as a target.

In addition, the radar unit 4 is attached to the rear bumper 6 by the attaching member 8 (see FIG. 8). According to this feature, the radar unit 4 is attached to the rear bumper 6 through the attaching member 8, so that it becomes possible to suppress wobbling of the radar unit 4, thereby preventing the occurrence of abnormal noise during vehicle running.

Further, the attaching member 8 has the locking portion 14 for allowing the attaching member 8 to be locked to the top surface of the rear bumper 6 in a suspended state (see FIG. 8). According to this feature, the attaching member 8 is locked to the rear bumper 6 by the locking portion 14, so that it becomes possible to stably support and fix the attaching member 8 and the radar unit 4 with respect to the rear bumper 6. There is also an advantage of being able to replace the rear bumper 6 and the attaching member 8 individually, during a mild impact collision.

Other features, functions and advantages of the fifth embodiment illustrated in FIGS. 7 to 9 are the same as those of the aforementioned embodiments. Thus, in FIGS. 7 to 9, the same element or component as that in the first embodiment is assigned with a common reference numeral or code, and its detailed description will be omitted.

Figure 10:
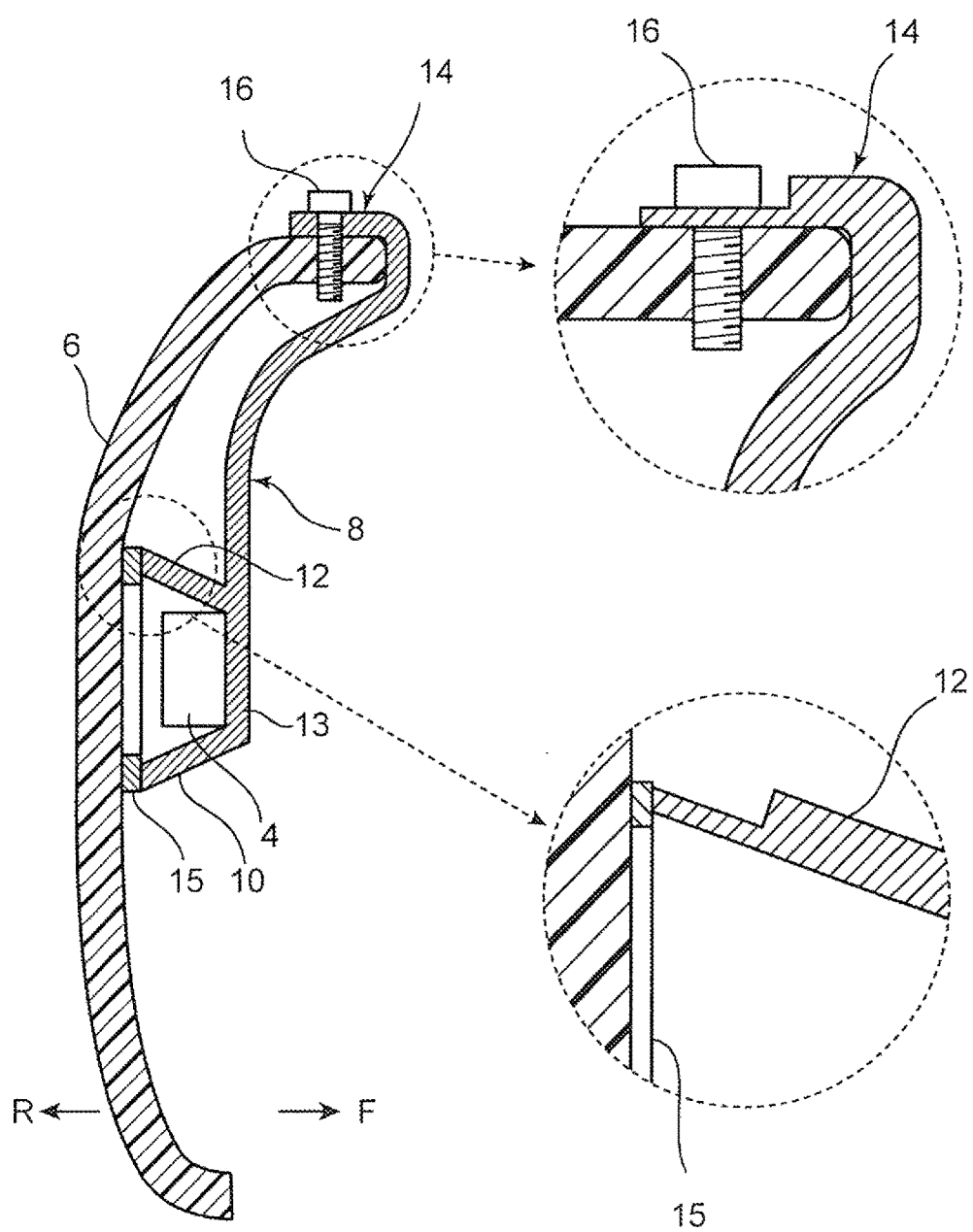
FIG. 10 is a sectional view illustrating an example of modification of the fifth embodiment.
Figure 11:
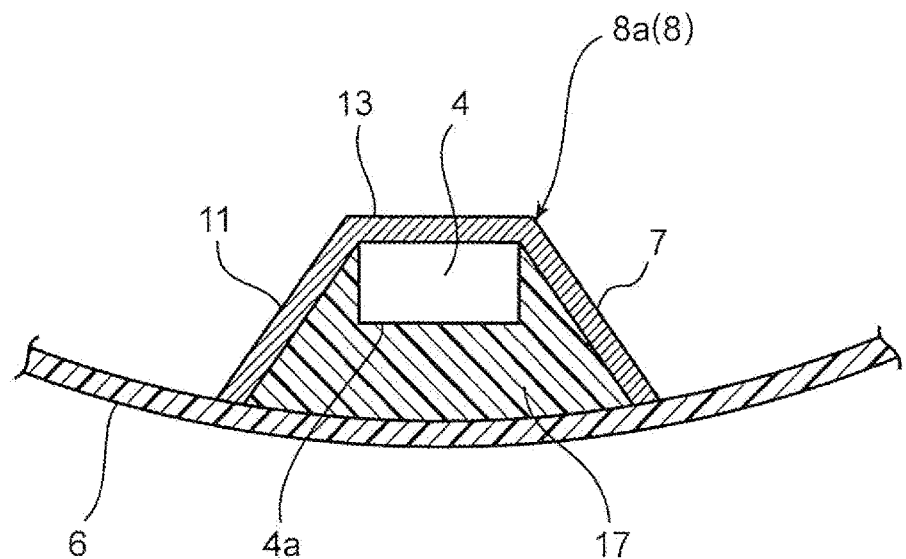
FIG. 11 is a sectional view (corresponding to FIG. 7) illustrating another example of modification of the fifth embodiment.
Figure 12:
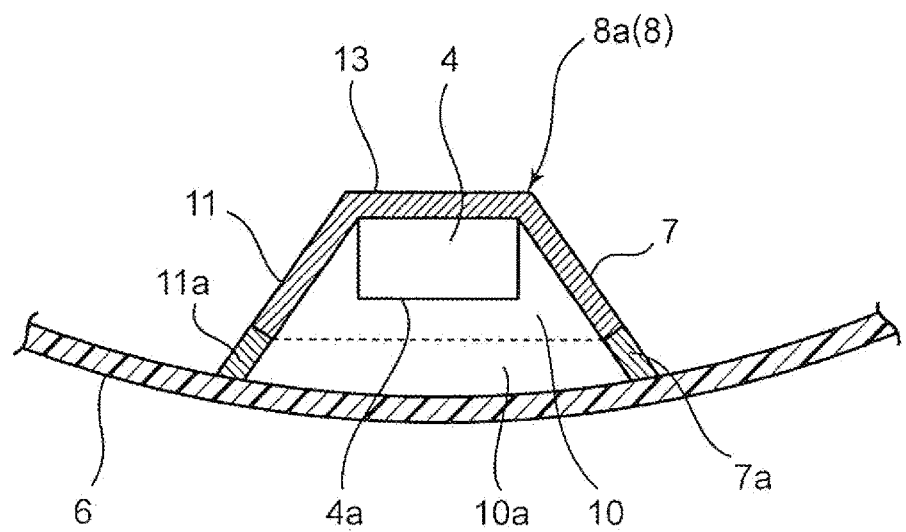
FIG. 12 is a sectional view (corresponding to FIG. 7) illustrating yet another example of modification of the fifth embodiment.

As an example of modification of the fifth embodiment, techniques illustrated FIGS. 10 to 12 may be employed.

In the modified embodiment illustrated in FIG. 10, as illustrated within a dashed circle as an enlarged view in the figure, a fixing region of the locking portion 14 of the attaching member 8 to be fixed to the rear bumper 6 by the bolt 16 is formed to have a wall thickness less than that of the remaining region of the locking portion 14. Similarly, a certain region of the housing section 8a (the shield plate 7 and the covers 10, 11, 12) including its edge on the side of the rear bumper 6 is formed to have a wall thickness less than that of the remaining region of the housing section 8a. That is, the attaching member 8 is formed such that a portion thereof to be attached (fixed) to the rear bumper 6 has a rigidity less than that of the remaining portion.

According to this technique, in the event of a vehicle collision, a bolt fixing region of the locking portion 14 and an edge region of the housing section 8a on the side of the rear bumper 6 are relatively easily deformed or broken, so that these regions function as a shock absorbing member, based on the deformation or the like. Thus, it becomes possible to ease an impact to be applied to the radar unit 4 during a vehicle collision, thereby protecting the radar unit 4.

In this embodiment, the attaching member 8 is configured such that the region to be fixed to the rear bumper 6 is formed to have a thickness less than that of the remaining region, thereby allowing the rigidity of the fixing region to become less than that of the remaining region. Alternatively, for example, it may be configured such that a slit (thin groove) is formed in a region to be fixed to the rear bumper 6 while maintaining thickness constant, thereby allowing the rigidity of the fixing region to become less than that of the remaining region.

Further, in this embodiment, the attaching member 8 is configured to reduce rigidity in both of the bolt fixing region of the locking portion 14, and the housing section 8a (the certain region of the shield plate 7 and the covers 10, 11, 12 including the edge thereof on the side of the rear bumper 6). In this case, when the attaching member 8 is completely broken in the two regions, the radar unit 4 can drop together with the attaching member 8. Thus, in order to prevent this problem, the attaching member 8 may be configured to reduce rigidity only in the housing section 8a.

In a modified embodiment illustrated in FIG. 11, an energy absorbing member 17 such as urethane is filled inside the housing section 8a of the attaching member 8.

According to this technique, in the event of a vehicle collision, a resulting impact load is absorbed by the energy absorbing member 17 to ease an impact to be applied to the radar unit 4. Thus, this technique can also be used to protect the radar unit 4. In this modified embodiment, it is preferable that a material having a permittivity equal to or approximately equal to that of the rear bumper 6 is used as the energy absorbing member 17. According to this technique, a transmission wave from the radar unit 4 is smoothly emitted toward an outside of the vehicle through the energy absorbing member 17 and the rear bumper 6. Thus, it becomes possible to prevent the occurrence of a situation where an unwanted reflected wave is generated by the energy absorbing member 17, to exert an influence on performance of the radar unit 4.

In a modified embodiment illustrated in HG 12, a certain region (the part which are shown with marks 7a, 10a, 11a in FIG. 12) of the housing section 8a of the attaching member 8 (the shield plate 7 and the covers 10, 11, 12) including its edge on the side of the rear bumper 6 is made of a material having a flexibility (softness) greater than that of the remaining region of the housing section 8a. For example, the attaching member 8 is formed by two-color molding or the like in such a manner that the certain edge region of the housing section 8a is made of an elastomer (soft rubber), and the remaining region is made of a synthetic resin. According to this technique, in the event of a vehicle collision, a resulting impact load is absorbed by the edge region (region made of an elastomer) of the housing member 8a to ease an impact to be applied to the radar unit 4. Thus, this technique can also be used to protect the radar unit 4.

Sixth Embodiment

FIG. 13 is an explanatory diagram illustrating a sixth embodiment for a vehicle obstacle detection device.

All of FIGS. 13A, 13B, 13C and 13D illustrate misdetection prevention members provided on a path of a tire reaching wave α from a radar unit 4. In the sixth embodiment, the misdetection prevention member is integrally formed with a rear bumper 6. In other words, a specific portion of the rear bumper 6 functions as the misdetection prevention member. Specifically, the misdetection prevention member is provided on a back surface of the rear bumper 6, at a reflection point RP (see FIGS. 3, 4, 5, 6 and 7, and a surrounding area thereof) where the tire reaching wave α from the radar unit 4 is reflected.

Figure 13A:
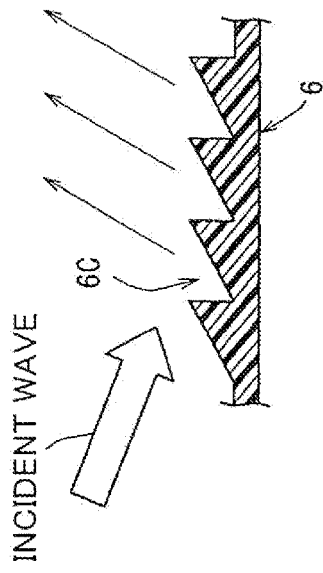
FIGS. 13A, 13B, 13C and 13D are, respectively: a sectional view illustrating an irregular reflection (diffusion) structure section; a sectional view illustrating another irregular reflection (diffusion) structure section; a Fresnel lens structure section; and a convex lens structure section.

In a structure illustrated in FIG. 13A, the reflection point RP and the surrounding area are formed as a diffuse reflection structure portion 6A which is composed of a plurality of cross-sectionally triangular-shaped irregularities and configured to diffusingly reflect an incident wave from the radar unit 4 to disperse energy of the incident wave, thereby suppressing the occurrence of the tire reaching wave α.

Figure 13B:
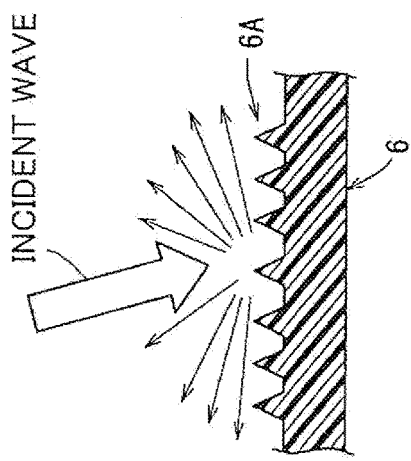

In a structure illustrated in FIG. 13B, the reflection point RP and the surrounding area are formed as a diffuse reflection structure portion 6B which is composed of a plurality of cross-sectionally semicircular-shaped irregularities and configured to diffusingly reflect an incident wave from the radar unit 4 to disperse energy of the incident wave, thereby suppressing the occurrence of the tire reaching wave α.

Figure 13C:
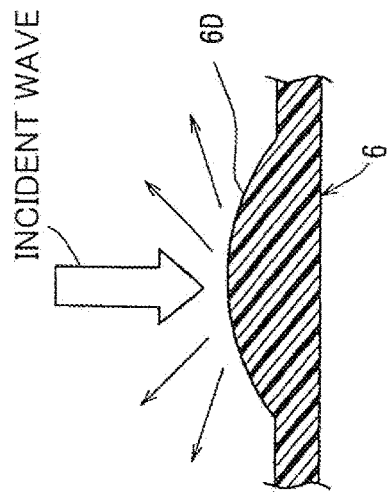

In a structure illustrated in FIG. 13C, the reflection point RP and the surrounding area are formed as a Fresnel lens structure portion 6C configured to change an angle of a reflected wave with respect to an incident wave, thereby controlling a deflection direction of the reflected wave so as not to exert an influence on misdetection, i.e., suppressing the occurrence of the tire reaching wave α.

Figure 13D:
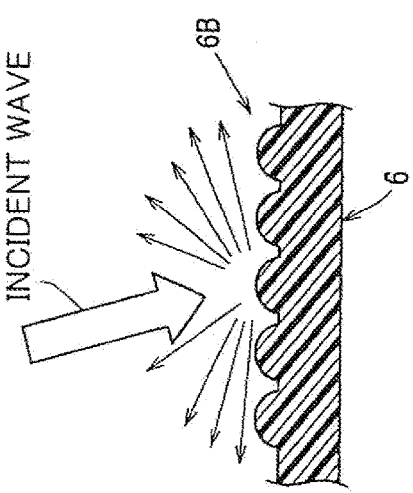

In a structure illustrated in FIG. 13D, the reflection point RP and the surrounding area are formed as a convex lens structure portion (so-called "semicylindrical-shaped portion") 6D configured to diffuse a reflected wave, thereby suppressing the occurrence of the tire reaching wave α.

As above, in the sixth embodiment illustrated in FIG. 13, the misdetection prevention member (see the structure portions 6A, 6B, 6C, 6D) is provided on the path of the tire reaching wave α from the radar unit 4, particularly, on the back surface of the rear bumper 6 in an integral manner, at the reflection point RP (see FIGS. 3 to 7) where the tire reaching wave α from the radar unit 4 is reflected, and the surrounding area. According to this feature, an incident wave from the radar unit 4 is effectively diffused or deflected. Therefore, the occurrence of the tire reaching wave α is effectively suppressed. This prevents a situation where the radar unit 4 misdetects a rear wheel 2 of an own vehicle as a target.

The above misdetection prevention member (see the diffuse reflection structure portions 6A, 6B, the Fresnel lens structure portion 6C, and the convex lens structure portion) is provided at the reflection point RP where the tire reaching wave α from the radar unit 4 is reflected by the back surface of the rear bumper 6, and can prevent the occurrence of the tire reaching wave α through the reflection point RP and the surrounding area.

For example, in place of the structure portions 6A, 6B, 6C, 6D illustrated in FIGS. 13A to 13D, a radio wave absorbing body prepared by mixing carbon or the like into a rubber member may be fixed to the back surface of the rear bumper 6, as the misdetection prevention member. In addition to the reflection point on the back surface of the rear bumper 6, one of the structure portions 6A, 6B, 6C, 6D illustrated in FIGS. 13A to 13D or the radio wave absorbing body may be employed at any required area of the aforementioned shield plate 7 or 9.

Seventh Embodiment

FIG. 14 is an explanatory diagram illustrating a seventh embodiment for a vehicle obstacle detection device.

Figure 14A:
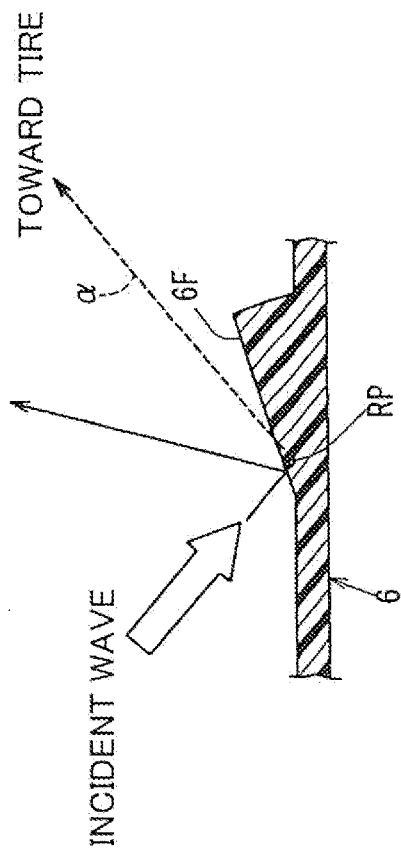
FIG. 14A is a sectional view illustrating a structure for deflecting and reflecting an incident wave.

FIG. 14A illustrates a structure for deflectingly reflecting an incident wave. In this structure, an auxiliary reflection plate 6E serving as a misdetection prevention member is bondingly fixed to a back surface of a rear bumper 6, at a reflection point RP where a tire reaching wave α is reflected by the back surface of the rear bumper 6 and a surrounding area thereof, in such a manner as to allow the auxiliary reflection plate 6E to change a reflection direction of an incident wave from a radar unit 4, thereby preventing the occurrence of a tire reaching wave α. According to this feature, the occurrence of a tire reaching wave α can be suppressed only by bondingly fixing the relatively small chip-like auxiliary reflection plate 6E to the back surface of the rear bumper 6 without any need for subjecting the back surface of the rear bumper 6 to special processing. This prevents a situation where the radar unit 4 misdetects a rear wheel 2 of an own vehicle as a target.

Figure 14B:
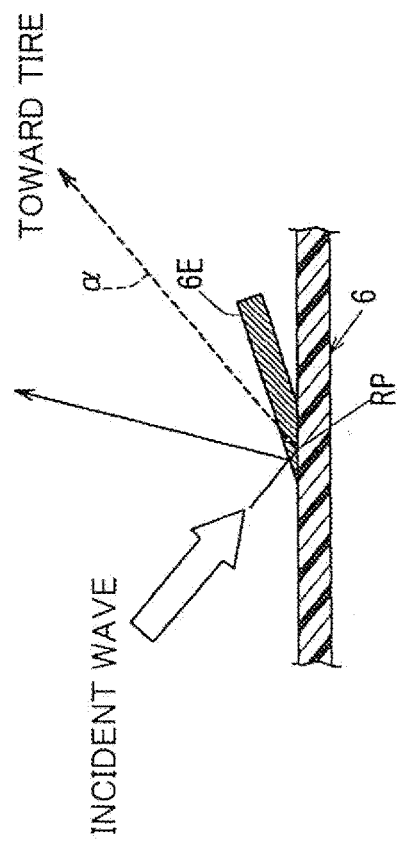
FIG. 14B is a sectional view illustrating an example in which an auxiliary reflection plate is integrally formed with a bumper.

FIG. 14B illustrates an example in which the above auxiliary reflection plate is integrally formed with the rear bumper 6. In this structure, an auxiliary reflection portion 6F serving as a misdetection prevention member is integrally formed with the rear bumper 6, at a reflection point RP where the tire reaching wave α is reflected by the back surface of the rear bumper 6 and the surrounding area thereof; in such a manner as to allow the auxiliary reflection portion 6F to change a reflection direction of an incident wave from the radar unit 4, thereby preventing the occurrence of a tire reaching wave α. According to this feature it becomes possible to prevent the situation where the radar unit 4 misdetects the rear wheel 2 of the own vehicle as a target without causing an increase in the number of components.

Eighth Embodiment

Figure 15:
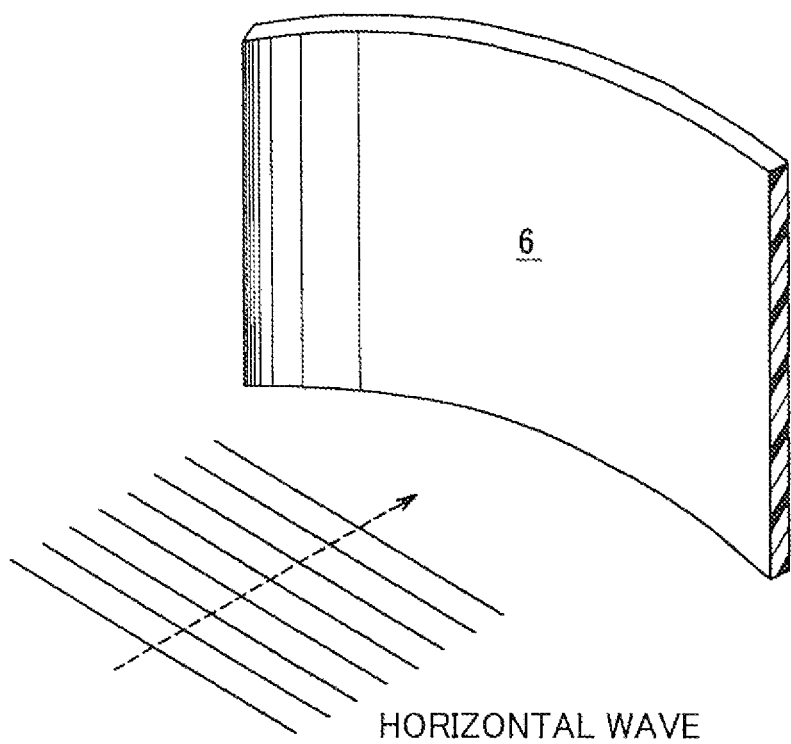
FIG. 15 is an explanatory diagram illustrating a shape of a bumper and a horizontal wave.
Figure 16:
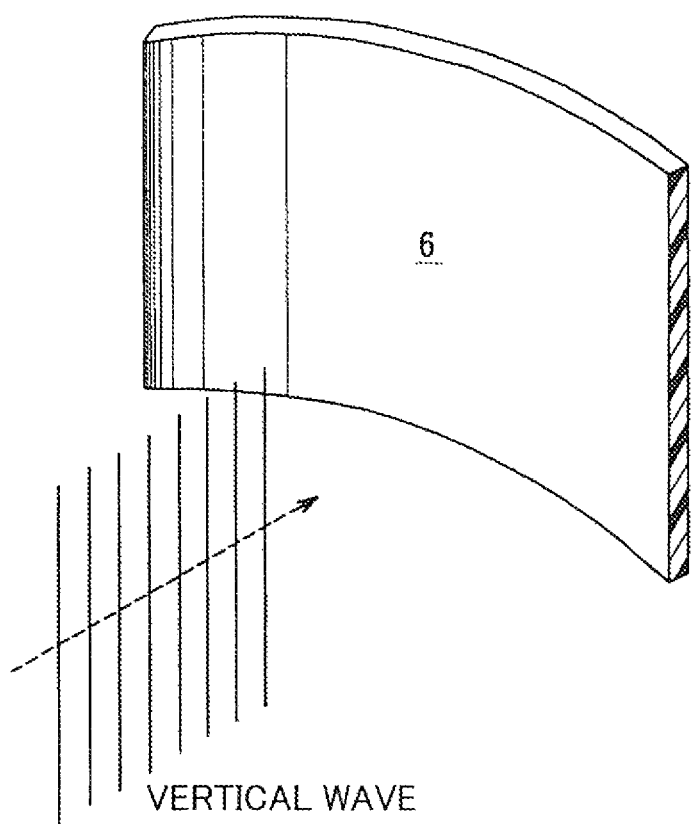
FIG. 16 is an explanatory diagram illustrating a shape of a bumper and a vertical wave.
Figure 17:
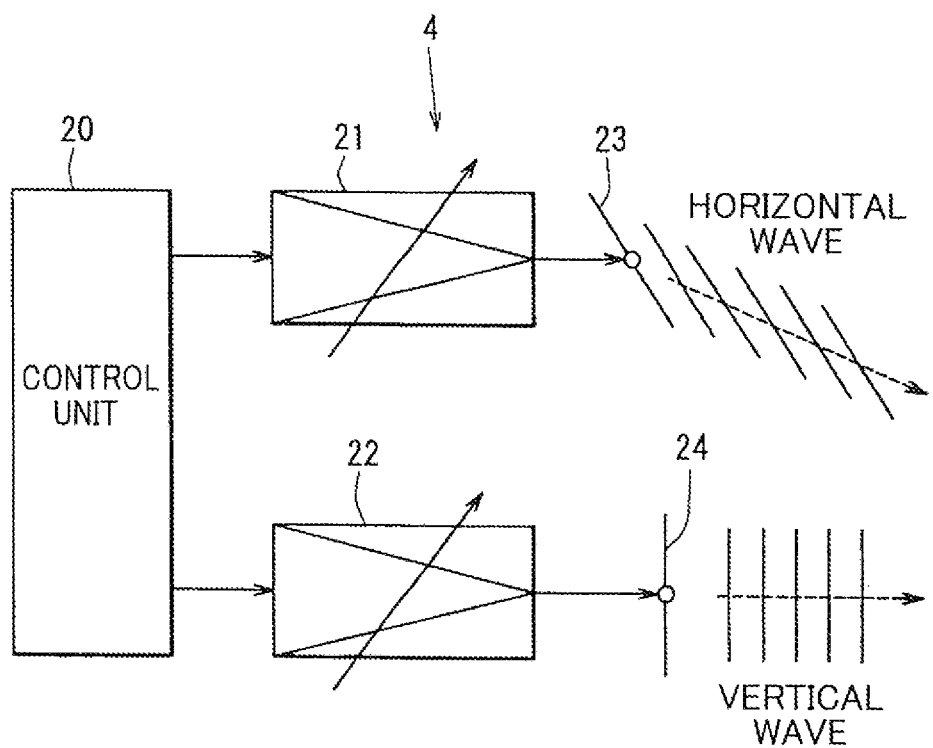
FIG. 17 is a control circuit block diagram illustrating an eighth embodiment for a vehicle obstacle detection device.

FIGS. 15 to 17 illustrate an eighth embodiment for a vehicle obstacle detection device.

As illustrated in FIG. 15, a horizontal wave (horizontally polarized wave) from a radar unit 4 has poor penetrability, i.e., high, reflectance, with respect to a horizontally curved rear bumper 6. On the other hand, as illustrated in FIG. 16, with respect to a rear bumper 6 having the same shape as that in FIG. 15, a vertical wave (vertically polarized wave) from a radar unit 4 has good penetrability, i.e., low reflectance.

However, a rear bumper 6 actually provided in a vehicle is three-dimensionally curved. Therefore, in the eighth embodiment, a control unit 20 is provided to control a polarization plane angle of a transmission wave, depending on a curvature of a back surface of the bumper (see FIG. 17).

As illustrated in FIG. 17, two transmitting antennas 23, 24 are connected to the control unit 20 via respective ones of two variable amplifiers 21, 22. Although the transmitting antennas 23, 24 are schematically illustrated in FIG. 17, a pattern antenna composed of a printed antenna pattern is actually employed in the radar unit 4.

Further, in this embodiment, one 23 of the transmitting antennas is a horizontal antenna, and the other transmitting antenna 24 is a vertical antenna. The control unit 20 is operable to control the variable amplifiers 21, 22 in such a manner as to minimize a wave to be incident on and reflected by the rear bumper 6, and to control an intensity ratio between radio waves (transmission waves) from the transmitting antennas 23, 24 and respective polarization plane angles of the radio waves.

As above, in the eighth embodiment, the radar unit 4 comprises the control unit 20 to control the polarization plane angle of the transmission radio wave, depending on a curvature of the back surface of the rear bumper 6 (see FIG. 17).

According to this feature, the control unit 20 controls the polarization plane angle of the transmission radio wave, so that it becomes possible to controllably minimize an unwanted radio wave which is incident on the back surface of the rear bumper 6 and reflected toward a rear wheel 2 of an own vehicle. Thus, the occurrence of the tire reaching wave α is effectively suppressed, and a negative influence of the tire reaching wave α can be avoided.

In this embodiment, an attenuator ay be used in place of the variable amplifiers 21, 22.

Ninth Embodiment

Figure 18:
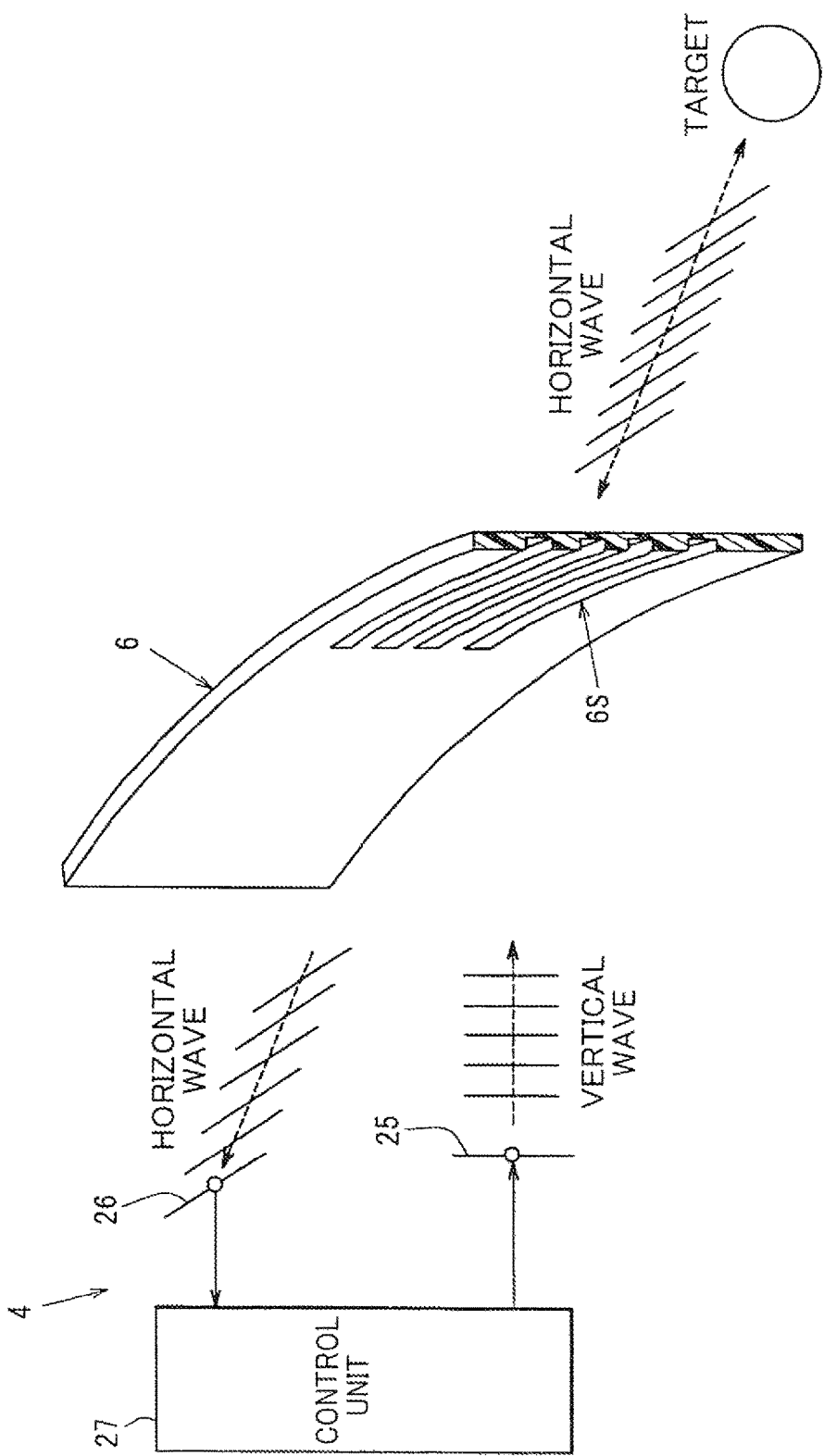
FIG. 18 is a control circuit block diagram illustrating a ninth embodiment for a vehicle obstacle detection device.

FIG. 18 is a control circuit block diagram illustrating a ninth embodiment for a vehicle obstacle detection device.

In this embodiment, a transmitter-receiver section 4a (see aforementioned figures) of a radar unit 4 is configured to set a polarization plane angle of a transmission radio wave and a polarization plane angle of a reception radio wave to become different from each other, and the rear bumper 6 is formed with a slit-like portion 6S coincident with the polarization plane angle of the reception radio wave.

Specifically, a vertical antenna 25 (transmitting antenna) serving as a transmitter section, and a horizontal antenna 26 (receiving antenna) serving as a receiver section, are provided, wherein the antennas 25, 26 are connected to a control unit 27. While a pattern antenna composed of a printed antenna pattern is actually employed as each of the antennas 25, 26, they are schematically illustrated in the figure.

A polarization plane angle (vertical) of a transmission radio wave from the vertical antenna 25 and a polarization plane an angle (horizontal) of a reception radio wave to be received by the horizontal antenna 26 are set differently from each other, and the rear bumper 6 is formed with a slit-like portion 6S coincident with the polarization plane angle (horizontal) of the reception radio wave.

The slit-like portion 6S is provided by forming a plurality of line-shaped recesses in a back surface of the bumper to extend in a vehicle-widthwise direction, while leaving a thin-walled portion (given-thickness wall portion) in a vehicle rearward-side outer surface of the rear bumper 6, without forming an elongate opening in the rear bumper 6 in order to ensure appearance of the rear bumper 6.

In this embodiment, when the control unit 27 operates to drive the vertical antenna 25, a vertical wave emitted from the antenna 25 is converted into a horizontal wave through the slit-like portion 6S of the rear bumper 6. Then, when the transmission wave converted to the horizontal wave is incident on a target, the horizontal wave is returned from the target as a reflected wave. Then, this reflected wave is transmitted through the slit-like portion 6S of the rear bumper 6, and received by the horizontal antenna 26.

That is, in the above configuration, the radar unit 4 can receive only a radio wave from an outside of the rear bumper 6 (a reflected wave transmitted through the slit-like portion 6S coincident with the polarization plane angle of the reception radio wave). Thus, even if a tire reaching wave α occurs, the tire reaching wave α is kept from being received by the transmitter-receiver section 4a. Specifically, when a vertical wave from the vertical antenna 25 is reflected by the back surface of the rear bumper 6, this reflected wave is a vertical wave. That is, even if a tire reaching wave α occurs, the tire reaching wave α cannot be received by the receiving horizontal antenna 26, because it a vertical wave.

As above, in the ninth embodiment illustrated in FIG. 18, the transmitter-receiver section 4a (see, specifically, the antennas 25, 26) of the radar unit 4 is configured to set the polarization plane angle of the transmission wave and the polarization plane angle of the reception wave to become different from each other, and the rear bumper 6 is formed with the slit-like portion 6S which is coincident with the polarization plane angle of the reception radio wave.

According to this feature, a radio wave from the outside of the rear bumper 6 is received by the transmitter-receiver section 4a through the slit-like portion 6S, whereas a reflected wave reflected by the back surface of the rear bumper 6 will never be received by the transmitter-receiver section 4a.

In this manner, the ninth embodiment is configured to permit only a radio wave from the outside of the rear bumper 6 to be received. This prevents a tire reaching wave α as a radio wave reflected by the back surface of the rear bumper 6 from being received. Thus, it becomes possible to prevent a situation where the radar unit 4 misdetects a rear wheel 2 of an own vehicle as a target.

Tenth Embodiment

Figure 19:
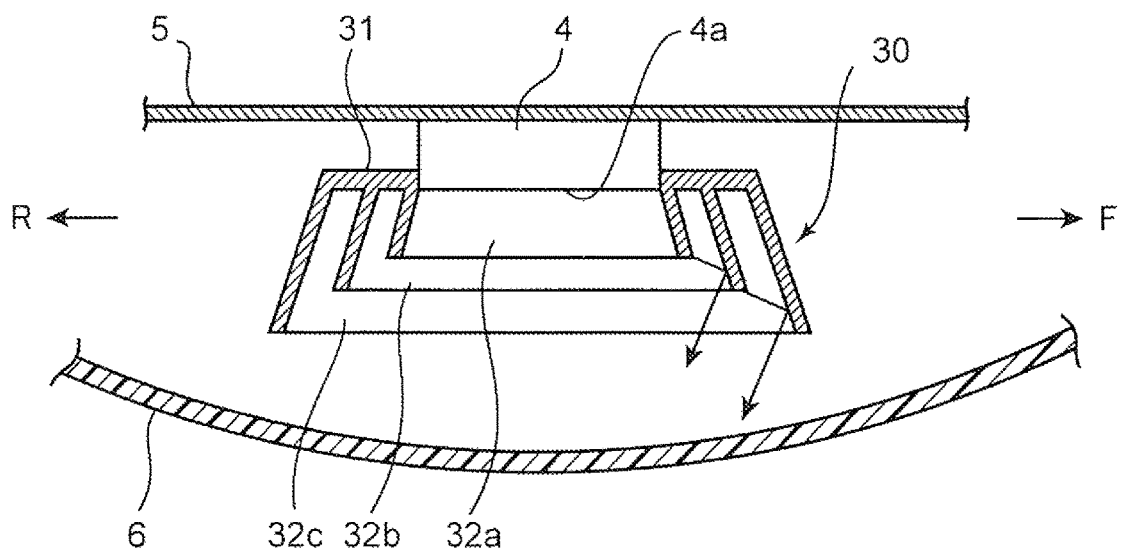
FIG. 19 is a sectional view illustrating a tenth embodiment for a vehicle obstacle detection device.
Figure 20:
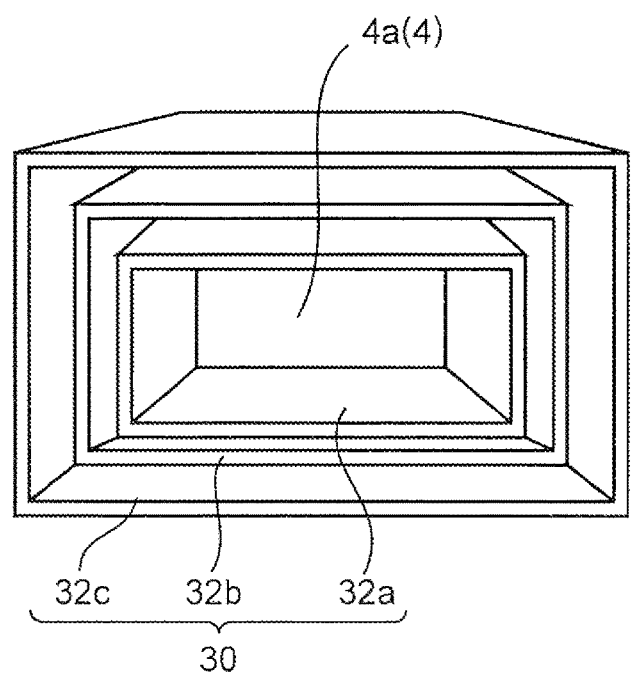
FIG. 20 is a perspective view of the vehicle obstacle detection device in FIG. 19, when viewed from the side of a rear bumper.

FIGS. 19 and 20 illustrate a tenth embodiment for a vehicle obstacle detection device, wherein FIG. 19 is a sectional view, and FIG. 20 is a perspective view, when viewed from the side of a rear bumper 6. In this embodiment, a radar unit 4 is attached to a rear end panel 5.

In this embodiment, a shield member 30 is mounted to the radar unit 4, as a misdetection prevention member. The shield member 30 has a fixing portion 31 configured to be fitted on and fixed to the radar unit 4, and three tubular shield portions 32a to 32c (hereinafter referred to as "first shield portion 32a", "second shield portion 32b" and "third shield portion 32c") extending from the fixing portion 31 toward the rear bumper 6, individually, and arranged in a nested manner, wherein the fixing portion 31 and the shield portions 32a to 32c are integrally formed in a single piece, for example, using a synthetic resin.

Each of the shield portions 32a to 32c has a cross-sectionally rectangular similar shape, and they are arranged with a certain gap therebetween. Each of them is formed in a folding-fan shape broadening from the radar unit 4 toward the rear bumper 6. The second shield portion 32b adjacent to the first shield portion 32a located at an inwardmost position protrudes toward the rear bumper 6 with respect to the first shield portion 32a, and the third shield portion 32c located at an outermost position further protrudes toward the rear bumper 6 with respect to the second shield portion 32b. Each of the shield portions 32a to 32c has an outward end spaced apart from the rear bumper 6.

In this vehicle obstacle detection device according to the tenth embodiment, when a transmission wave is transmitted from the radar unit 4 through the shield portions 32a to 32c, a diffraction phenomenon occurs, so that a transmission wave primarily corresponding to a side lobe undergoes reflection (or repetitive reflections) at positions of the shield portions 32a to 32c, and thereby gradually attenuate, as indicated by the arrowed lines in FIG. 19. Thus, according to this feature, a transmission wave oriented to pass between a transmitter-receiver section 4a of the radar unit 4 and a back surface of the rear bumper 6 and reach a rear wheel 2 can be adequately blocked, i.e., the occurrence of the tire reaching wave α can be effectively suppressed.

Figure 21:
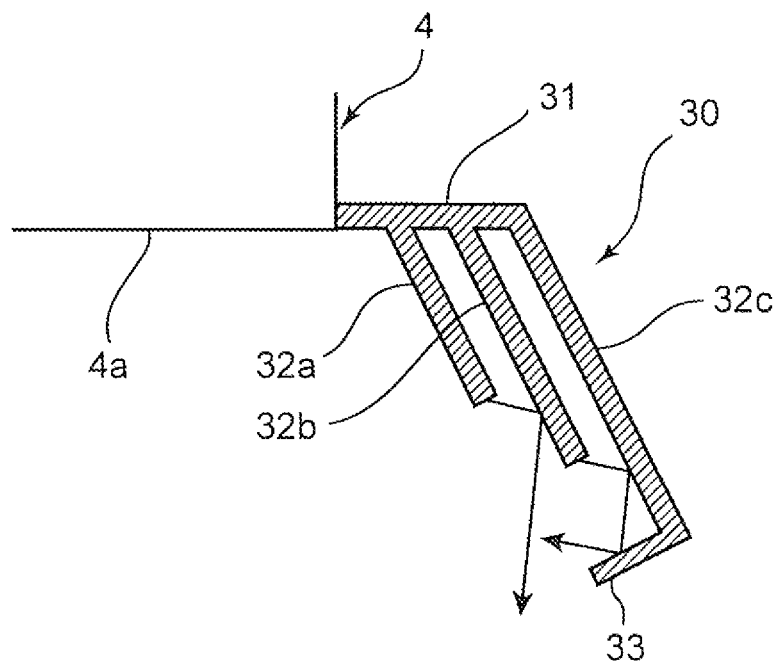
FIG. 21 is a fragmentary sectional view (corresponding to FIG. 19) illustrating an example of modification of the tenth embodiment.

In this embodiment, the shield member 30 has the three-layer shield portions 32a to 32c. Alternatively, the shield portion may have a two-layer structure, or may have a four or more-layer structure. Further, as illustrated in FIG. 21, the third shield portion 32c (the shield portion located at the outermost position) may be formed with an extension 33 inwardly extending from the outward end thereof to reflect a transmission wave inwardly, thereby making it possible to highly suppress the occurrence of a tire reaching wave α.

Eleventh Embodiment

Figure 22:
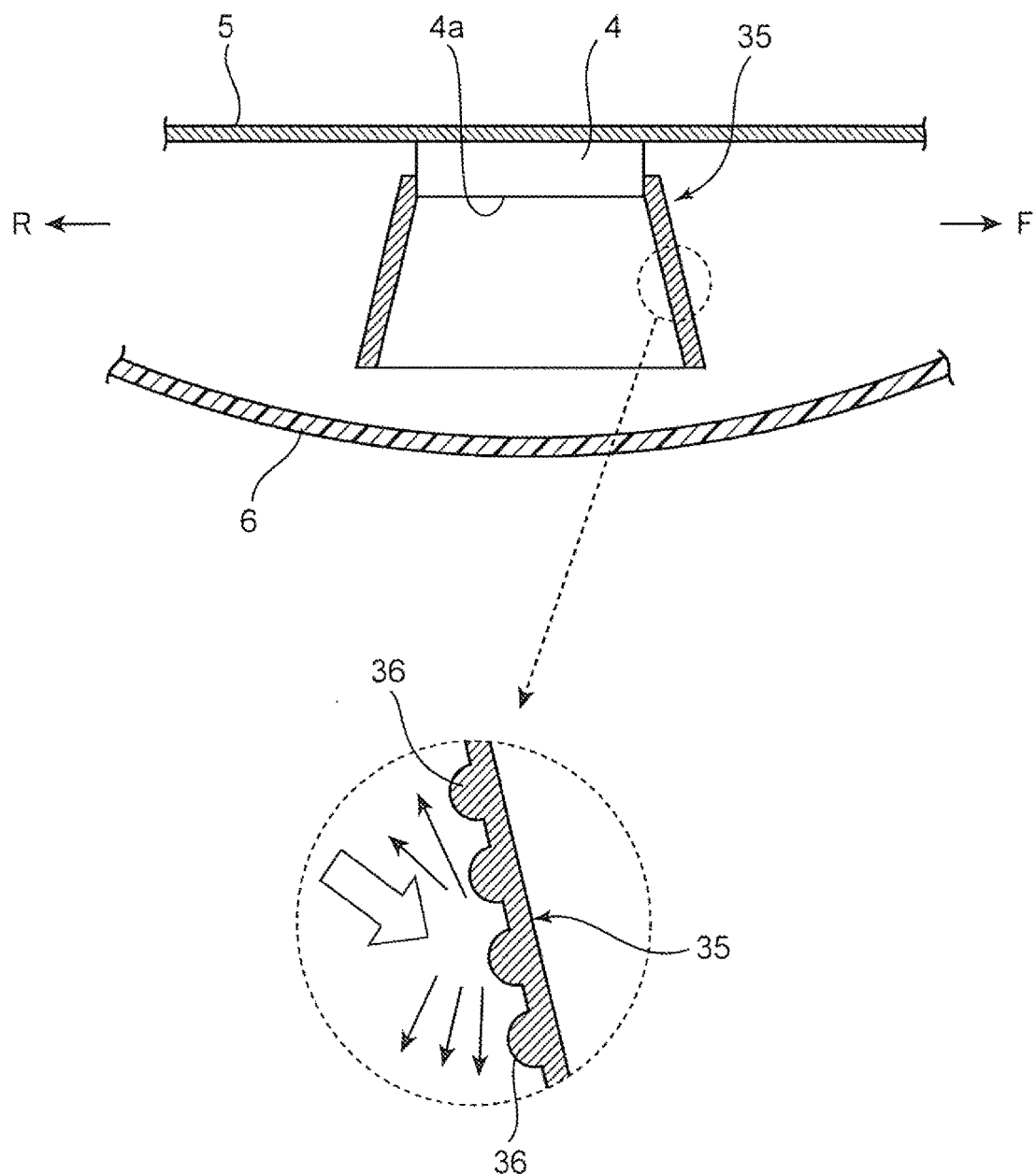
FIG. 22 is a sectional view illustrating an eleventh embodiment for a vehicle obstacle detection device.

FIG. 22 is a sectional view illustrating an eleventh embodiment for a vehicle obstacle detection device. In this embodiment, a radar unit 4 is attached to a rear end panel 5.

In this embodiment, a shield member 35 is mounted to the radar unit 4, as a misdetection prevention member.

The shield member 35 is a cross-sectionally quadrangular tubular member made of a synthetic resin, and fixed to the radar unit 4 in a state in which one end thereof is fitted on the peripheral surface of the radar unit 4. The shield member 35 is formed in a folding-fan shape broadening from the radar unit 4 toward the rear bumper 6, and an inner peripheral surface thereof is formed as a concave-convex surface in which a plurality of cross-sectionally circular or convex lens-like (so-called "semicylindrical") convex portions 36 are arranged side-by-side in a regular or irregular manner. The shield member 35 has an outward end spaced apart from the rear bumper 6.

In this vehicle obstacle detection device according to the eleventh embodiment, a transmission wave corresponding to a side lobe (indicated by the outlined arrow in the figure) in a transmission wave from the radar unit 4 becomes incident on the inner peripheral surface (concave-convex surface) of the shield member 35, and undergoes diffuse reflection. Thus, a transmission wave oriented to pass between a transmitter-receiver section 4a of the radar unit 4 and a back surface of the rear bumper 6 and reach a rear wheel 2 is diffused, and the occurrence of the tire reaching wave α is suppressed.

In this embodiment, it is considered that each concaved portion of the inner peripheral surface (concave-convex surface) of the shield member 35 is reduced in wall thickness, and therefore a transmission wave can penetrate through the concaved portion. Thus, in order to more reliably suppress the occurrence of a tire reaching wave α, it is preferable to use a structure as illustrated in FIG. 23 as the shield member 35.

Figure 23:
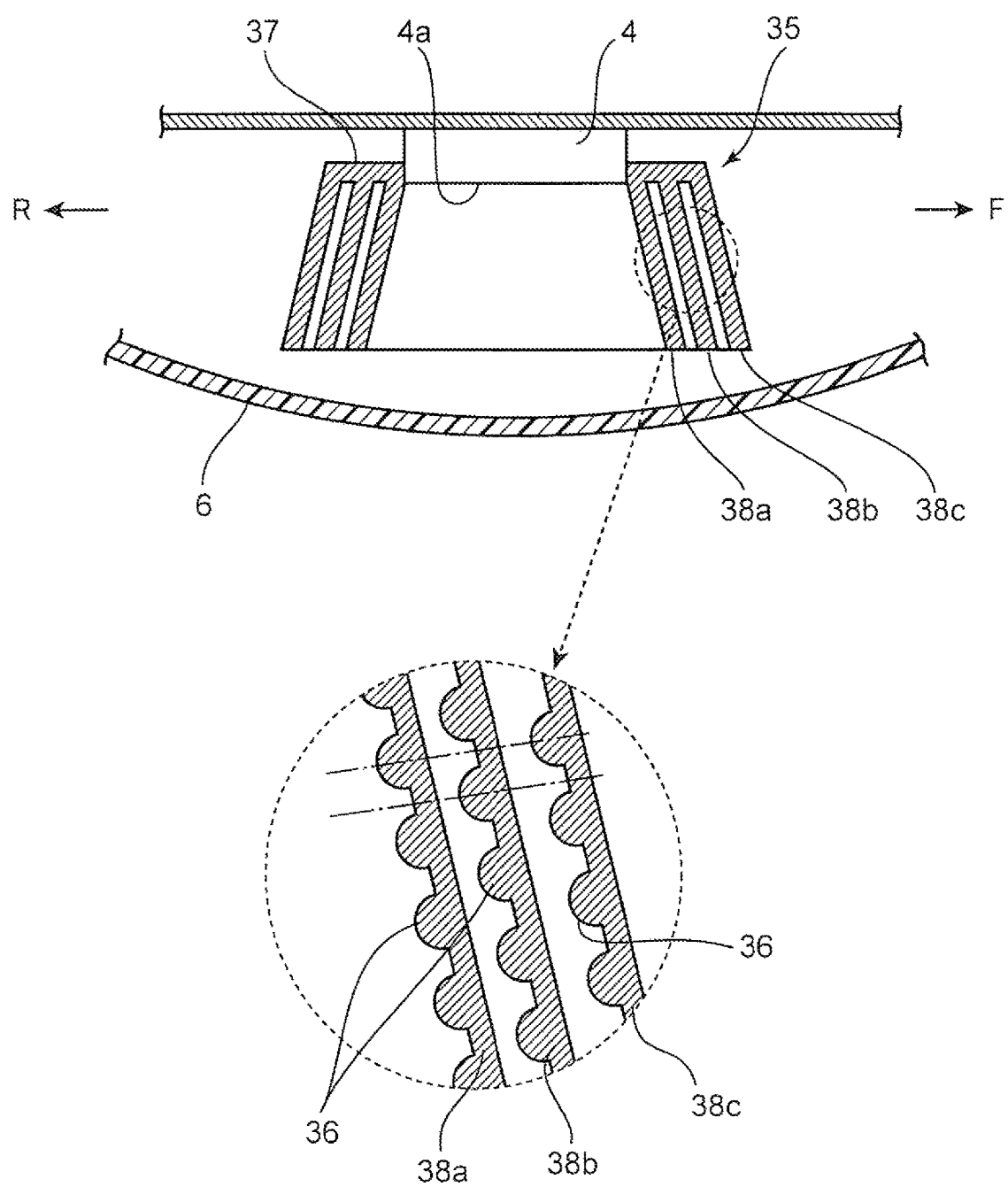
FIG. 23 is a fragmentary sectional view corresponding to FIG. 22) illustrating an example of modification of the eleventh embodiment.

A shield member 35 illustrated in FIG. 23 has a fixing portion 37 configured to be fitted on and fixed to the radar unit 4, and three tubular shield portions 38a to 38c extending from the fixing portion 37 toward the rear bumper 6, individually, and arranged in a nested manner, wherein the fixing portion 37 and the shield portions 38a to 38c are integrally formed in a single piece, for example, using a synthetic resin. Each of the shield portions 38a to 38c has a cross-sectionally rectangular similar shape, and they are arranged with a certain gap therebetween. Each of them is formed in a folding-fan shape broadening from the radar unit 4 toward the rear bumper 6. Further, as illustrated as an enlarged view within the dashed circle in the figure, in adjacent two of the shield portions, two groups of the convex portions 36 (concave portions) on respective inner peripheral surfaces of the adjacent shield portions are formed in an offset arrangement.

In the shield member 35 in this embodiment, a transmission wave penetrating through the inward shield portion 38a (38b) at a position of the concave portion becomes incident on the convex portion of the outward shield portion 38b (38c) and undergoes diffuse reflection. In addition, the transmission wave will attenuate during the course of penetrating through the plurality of shield portions 38a to 38c in the above manner, so that it becomes possible to more reliably suppress the occurrence of the tire reaching wave α. In the embodiment illustrated in FIG. 23, the shield member 35 has the three-layer shield portions 38a to 38c. Alternatively, the shield portion may have a two-layer structure, or may have a four or more-layer structure.

Twelfth Embodiment

Figure 24:
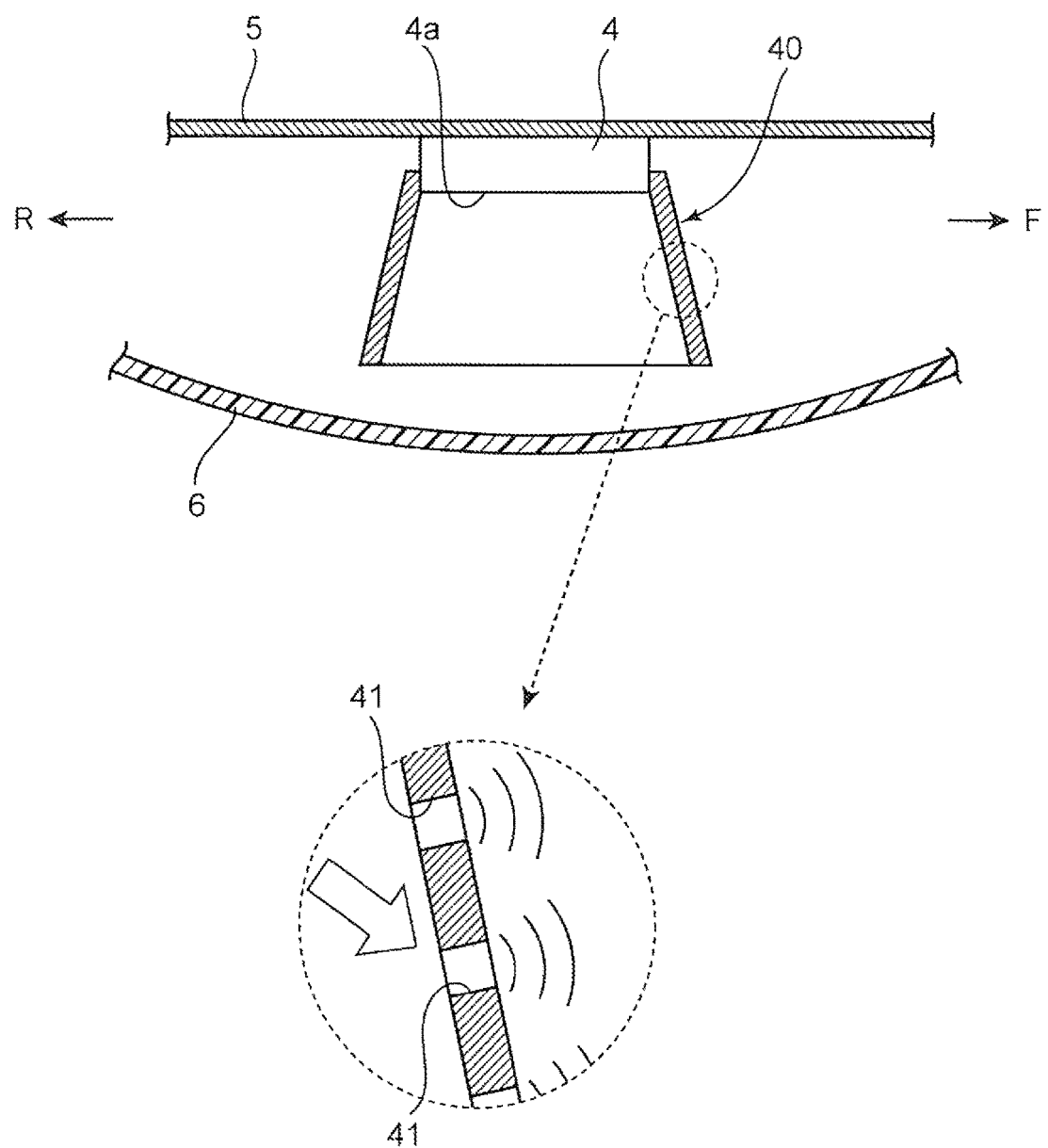
FIG. 24 is a sectional view illustrating a twelfth embodiment for a vehicle obstacle detection device.

FIG. 24 is a sectional view illustrating a twelfth embodiment for a vehicle obstacle detection device. In this embodiment, a shield member 40 illustrated in the figure is mounted to a radar unit 4, as a misdetection prevention member. This shield member 40 has the same structure as that of the shield member 35 in the eleventh embodiment (see FIG. 22), except that a plurality of openings 41 (through-holes) are formed in each sidewall instead of the convex portions 46. The plurality of openings 41 are formed and arranged in each sidewall in a regular or irregular manner.

In this vehicle obstacle detection device according to the twelfth embodiment, a transmission wave corresponding to a side lobe (indicated by the outlined arrow in the figure) in a transmission wave from the radar unit 4 becomes incident on an inner peripheral surface (sidewall) of the shield member 40. Although a part of the transmission wave passes through the openings 41, this partial transmission wave is diffused by a diffraction phenomenon during passing through the openings, and will attenuate or disappear. In this manner, the occurrence of a tire reaching wave α is suppressed.

In this embodiment, the sidewall of the shield member 40 has a single-layer structure. Alternatively, the shield member 40 may have a nested structure having a plurality of sidewalls as in the example illustrated in FIG. 23. In this case, it is preferable that two groups of the openings in adjacent two of the sidewalls are offset from each other. In this configuration, a transmission wave passing through the inward sidewall is reflected by the outward sidewall, which provides enhanced transmission wave shielding effect.

Thirteenth Embodiment

Figure 25:
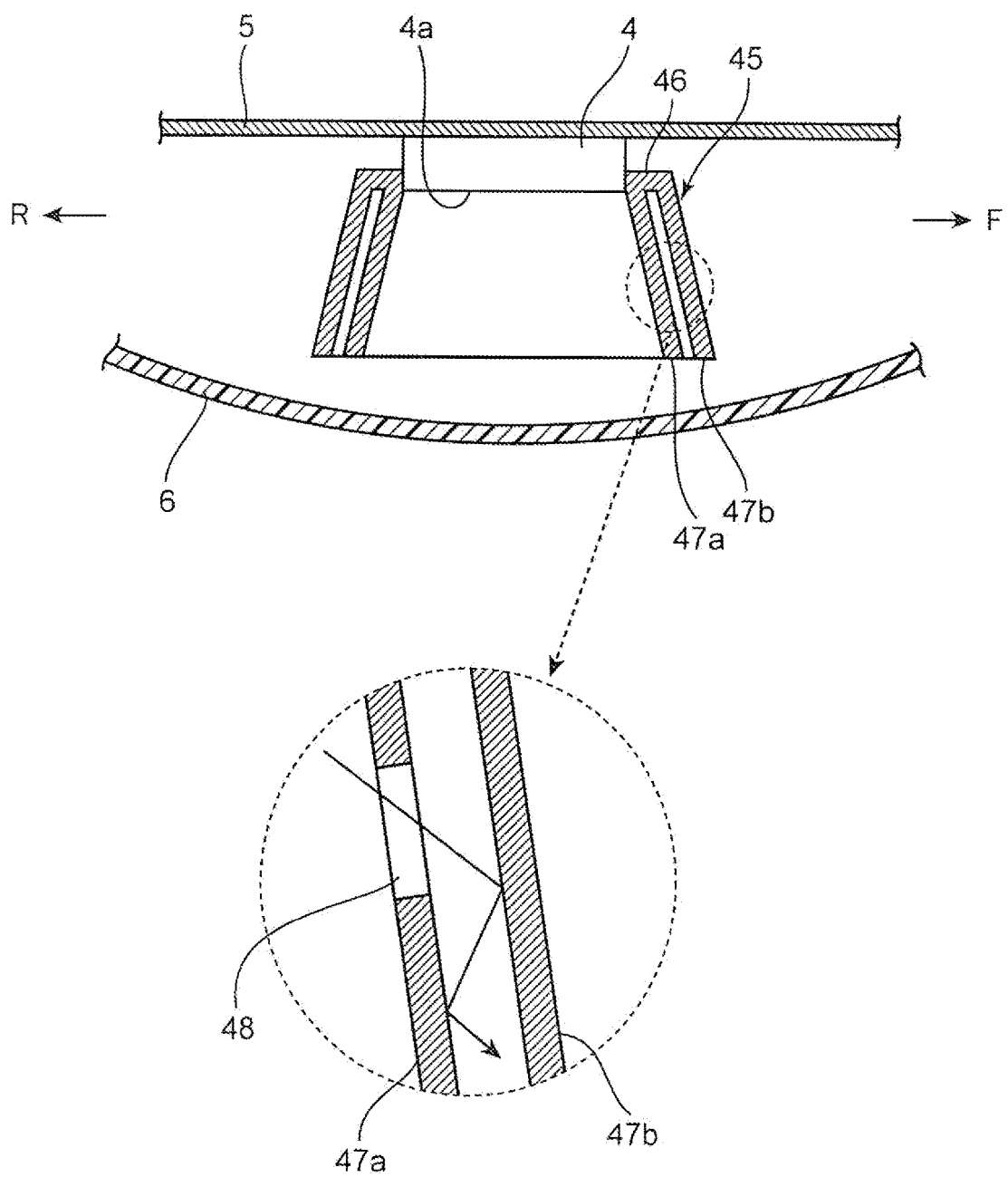
FIG. 25 is a sectional view illustrating a thirteenth embodiment for a vehicle obstacle detection device.

FIG. 25 is a sectional view illustrating a thirteenth embodiment for a vehicle obstacle detection device. In this embodiment, a radar unit 4 is attached to a rear end panel 5.

In this embodiment, a shield member 45 is mounted to the radar unit 4. The shield member 45 has a fixing portion 46 configured to be fitted on and fixed to the radar unit 4, and two tubular shield portions 47a, 47b extending from the fixing portion 46 toward the rear bumper 6, individually, and arranged in a nested manner, wherein the fixing portion 46 and the shield portions 47a, 47b are integrally formed in a single piece, for example, using a synthetic resin. Each of the shield portions 47a, 47b has a cross-sectionally rectangular similar shape, and they are arranged with a certain gap therebetween. Each of them is formed in a folding-fan shape broadening from the radar unit 4 toward the rear bumper 6. Further, as illustrated as an enlarged view within the dashed circle in the figure, an opening 48 is formed in an inward one 47a of the shield portions 47a, 47b, at a position corresponding to a path, primarily, of a side lobe in a transmission wave from the radar unit 4. No opening is formed in the outward shield portion 47b. Each of the shield portions 47a, 47b has an outward end spaced apart from the rear bumper 6.

In this vehicle obstacle detection device according to the thirteenth embodiment, as illustrated in the figure, after passing through the opening of the inward shield portion 47a, the transmission wave corresponding to the side lobe in the transmission wave from the radar unit 4 is reflected by the outward shield portion 47b, and will gradually attenuate through repetitive reflections between the inward and outward shield portions 47a, 47b. Thus, it becomes possible to effectively block a transmission wave which passes between a transmitter section of the radar unit 4 and a back surface of the rear bumper 6 and reach a rear wheel 2, thereby suppressing the occurrence of the tire reaching wave α.

A correspondence between the above embodiment and elements of the present invention defined in the appended claims is summarized as follows. The rear bumper 6 is equivalent to the bumper in the appended claims. The rear wheel 2 is equivalent to the wheel in the appended claims. The tire reaching wave α is equivalent to the own-vehicle's wheel reaching wave in the appended claims. Each of the shield plates 7, 9, the diffuse reflection structure portions 6A, 6B, the Fresnel lens structure portion 6C, the convex lens structure portion 6D, the auxiliary reflection plate 6E, the auxiliary reflection portion 6F, and the shield members 30, 35, 40, 45 is equivalent to the misdetection prevention member in the appended claims. The control unit 20 is equivalent to the control unit in the appended claims.

The present invention is not limited to the above embodiments.

For example, although the above embodiments have been described based on an example where the present invention is applied to the vehicle obstacle detection device for detecting an obstacle located behind a vehicle, the present invention may be applied to a vehicle obstacle detection device for detecting an obstacle located ahead of a vehicle.

Further, although a 24 GHz microwave (SHF) was used as a radio wave of the radar unit 4, a millimeter wave (EHF) having a wavelength of 1 cm to 1 mm and a frequency of 30 GHz to 300 GHz may be used.

The structure of FIG. 10 may be employed in the shield plate 7, 9 or the like. As the shield plate 7, 9 or the like, it is possible to use a radio wave absorbing body, a material prepared by bonding a metal plate to a resin, a material prepared by depositing a metal on a resin, a material prepared by mixing a metal into a resin, or a martial prepared by forming a metal plated layer on a resin surface by chemical plating.

Instead of forming the shield plate 7, 9 or the like, for example, by bonding a metal plate to a resin, carbon may be mixed into a resin. This makes it possible to facilitate an increase in strength and a reduction in cost of the shield plate 7, 9 or the like, while obtaining a shielding or blocking effect approximately equal to the technique, for example, of bonding a metal plate to a resin. In this case, particularly, when carbon fibers are be mixed into a resin, a higher blocking effect can be obtained based on the carbon fibers which exist inside the shield plate 7 or 9 approximately in a mesh pattern. In molding of the shield plate 7, 9 or the like, the resin with carbon fibers may be introduced in a cavity from two directions orthogonal to each other. This provides a higher possibility that the carbon fibers exist inside the shield plate 7, 9 or the like in a mesh pattern. Thus, this molding technique has an advantage of providing an enhanced blocking effect to the shield plate 7, 9 or the like, while suppressing a content rate of carbon fibers in the shield plate 7, 9 or the like.

In view of preventing the occurrence of a tire reaching wave α, it is effective to increase a size of each of the shield plates 7, 9, the housing section 8a of the attaching member 8 and the shield members 30, 35, 40, 45. However, when the shield plate 7 or the like is increased in size, visibility (for bolts and nuts) around installation positions of the shield plate 7 or the like and other components can be reduced to hinder assembling works and maintenance works. Thus, the shield plate 7 or the like may be formed with a slit or a punched hole for ensuring the visibility. In this case, it is necessary that a size of the slit or the like is set to block a transmission wave from the radar unit 4, while allowing only light to pass therethrough. Specifically, the size is preferably set to a value equal to or less than ¼ of a wavelength of the transmission wave.

The aforementioned invention is outlined as follows.

According to one aspect of the present invention, there is provided a vehicle obstacle detection device which comprises: a radar unit provided between a back surface of a bumper and a wheel and configured to detect an obstacle by transmitting a radio wave toward outside of an own vehicle through the bumper; and a misdetection prevention member for preventing misdetection in the radar unit by suppressing the occurrence of an own-vehicle's wheel reaching wave which is a part of a transmission wave from the radar unit and which passes between a transmitter section of the radar unit and the back surface of the bumper and reaches the wheel of the own vehicle. As a radio wave of the radar unit, a microwave wave or a millimeter wave may be employed, and, for example, a radio wave having a frequency of 24 GHz or 76 GHz may be used. Further, as the bumper, a resin bumper may be used which is capable of allowing radio waves to be transmitted therethrough. The above feature suppresses a situation where a part of a transmission wave from the radar unit passes between the transmitter section of the radar unit and the back surface of the bumper and reaches the wheel of the own vehicle, thereby preventing misdetection caused by the own-vehicle's wheel reaching wave returned from the own vehicle's wheel, i.e., a situation where the own vehicle's wheel is misdetected as a target.

In this vehicle obstacle detection device, the misdetection prevention member is a shield plate provided to block a path of the own-vehicle's wheel reaching wave. According to this feature, the misdetection prevention member can be constructed by a simple shield plate.

In the above vehicle obstacle detection device, the shield plate is provided to extend from the radar unit toward the back surface of the bumper, or provided to extend from the back surface of the bumper toward the radar unit. According to this feature, a transmission wave is blocked by the shield plate provided to extend from the radar unit toward the back surface of the bumper, or the shield plate provided to extend from the back surface of the bumper toward the radar unit.

In the above vehicle obstacle detection device, the misdetection prevention member is provided on a path of the own-vehicle's wheel reaching wave, and configured to diffract or diffuse the transmission wave. According to this feature, the occurrence of the own-vehicle's wheel reaching wave is suppressed by diffraction or diffusion of a transmission wave oriented to pass between the transmitter section of the radar unit and the back surface of the bumper and reaches the wheel of the own vehicle.

In the above vehicle obstacle detection device, the misdetection prevention member is provided on a path of the own-vehicle's wheel reaching wave and at and around a reflection point where the own-vehicle's wheel reaching wave is reflected by the back surface of the bumper. According to this feature, the occurrence of the own-vehicle's wheel reaching wave is suppressed by diffusion, deflection or absorption of a transmission wave, based on the misdetection prevention member provided at and around the reflection point.

In the vehicle obstacle detection device, the shield plate is provided closer to the own-vehicle's wheel than a reflection point where the own-vehicle's wheel reaching wave is reflected by the back surface of the bumper. According to this feature, the shield plate is provided closer to the own-vehicle's wheel than the reflection point, so that it becomes possible to efficiently block the transmission wave by the shield plate disposed at a position maximally close to the own-vehicle's wheel.

In the above vehicle obstacle detection device, the radar unit comprises a control unit to control a polarization plane angle of the transmission radio wave, depending on a curvature of the back surface of the bumper. According to this feature, it becomes possible to, based on control of the polarization plane angle of the transmission radio wave by the control unit, minimize an unwanted radio wave which is incident on the back surface of the bumper and reflected toward the own-vehicle's wheel, thereby suppressing the occurrence of the own-vehicle's wheel reaching wave.

In this case, the radar unit has a transmitter-receiver section configured to set a polarization plane angle of the transmission radio wave and a polarization plane angle of a reception radio wave to become different from each other, and the bumper is formed with a slit-like portion coincident with the polarization plane angle of the reception radio wave. The slit-like portion includes both of a structure in which a slot is formed as an opening in the bumper, and a recess is formed in the back surface of the bumper in a slit-like pattern.

According to this feature, the slit-like portion is coincident with the polarization plane angle of the reception radio wave, so that a radio wave from an outside of the bumper is received by the receiver section through the slit-like portion. On the other hand, the polarization plane angle of the transmission radio wave is different from the polarization plane angle of the reception radio wave, so that a reflected wave reflected by the back surface of the bumper will never be received by the receiver section. That is, the receiver section receives only a radio wave from the outside of the bumper. Thus, even when the own-vehicle's wheel reaching wave occurs, the own-vehicle's wheel reaching wave will never be received, because it is reflected by the back surface of the bumper. Thus, it becomes possible to suppress misdetection caused by receiving the own-vehicle's wheel reaching wave.

In the vehicle obstacle detection device, the radar unit is attached to the bumper through an attaching member. According to this feature, the radar unit is attached to the bumper through the attaching member, so that it becomes possible to suppress wobbling of the radar unit, thereby preventing the occurrence of abnormal noise during vehicle running.

In the vehicle obstacle detection device, the attaching member has a locking portion for allowing the attaching member to be locked to a top surface of the bumper. According to this feature, the attaching member is locked to the bumper by the locking portion, so that it becomes possible to stably support and fix the attaching member and the radar unit with respect to the rear bumper.

Further, the attaching member is formed in such a manner that a portion of the attaching member to be attached onto the bumper has a rigidity less than that of a remaining portion of the attaching member. According to this technique, in the event of a vehicle collision, the attaching portion to the bumper is relatively easily deformed, so that this portion functions as a shock absorbing member. Thus, it becomes possible to ease an impact to be applied to the radar unit during a vehicle collision, thereby protecting the radar unit.

INDUSTRIAL APPLICABILITY

As above, the vehicle obstacle detection device of the present invention is capable of preventing a situation where an own-vehicle's wheel is misdetected as a target, and is therefore useful in the vehicle manufacturing field and others.

What is claimed is:

1. A vehicle obstacle detection device comprising:
a radar unit provided between a back surface of a bumper and a wheel and configured to detect an obstacle by transmitting a radio wave toward outside of an own vehicle through the bumper, the radar unit and the wheel being positioned closer to a first side of the own vehicle than to a second side of the own vehicle; and
a misdetection prevention member for preventing misdetection in the radar unit by suppressing the occurrence of an own-vehicle's wheel reaching wave which is a part of a transmission wave from the radar unit and which passes between a transmitter section of the radar unit and the back surface of the bumper and reaches the wheel on the first side of the own vehicle,
wherein the misdetection prevention member is provided at a position along a path of the own-vehicle's wheel reaching wave between the radar unit and the own vehicle's wheel on the first side of the vehicle and closer to the radar unit than a reflection point where the own-vehicle's wheel reaching wave is reflected by the back surface of the bumper to block the path of the own-vehicle's wheel reaching wave.

2. The vehicle obstacle detection device as defined in claim 1, wherein the misdetection prevention member is a shield plate provided to block the path of the own-vehicle's wheel reaching wave.

3. The vehicle obstacle detection device as defined in claim 2, wherein the shield plate is provided to extend from the radar unit toward the back surface of the bumper, or provided to extend from the back surface of the bumper toward the radar unit.

4. The vehicle obstacle detection device as defined in claim 1, wherein the misdetection prevention member is configured to diffract or diffuse the transmission wave.

5. The vehicle obstacle detection device as defined in claim 1, wherein the misdetection prevention member is provided on a path of the own-vehicle's wheel reaching wave and at and around a reflection point where the own-vehicle's wheel reaching wave is reflected by the back surface of the bumper.

6. The vehicle obstacle detection device as defined in claim 1, wherein the radar unit comprises a control means unit to control a polarization plane angle of the transmission radio wave, depending on a curvature of the back surface of the bumper.

7. The vehicle obstacle detection device as defined in claim 1, wherein the radar unit has a transmitter-receiver section configured to set a polarization plane angle of the transmission radio wave and a polarization plane angle of a reception radio wave to become different from each other, and the bumper is formed with a slit-like portion coincident with the polarization plane angle of the reception radio wave.

8. The vehicle obstacle detection device as defined in claim 1, wherein the radar unit is attached to the bumper through an attaching member.

9. The vehicle obstacle detection device as defined in claim 8, wherein the attaching member has a locking portion for allowing the attaching member to be locked to a top surface of the bumper.

10. The vehicle obstacle detection device as defined in claim 8, wherein the attaching member is formed in such a manner that a portion of the attaching member to be attached onto the bumper has a rigidity less than that of a remaining portion of the attaching member.

\* \* \* \* \*